(12) United States Patent
Leonard

(10) Patent No.: US 9,352,632 B2
(45) Date of Patent: May 31, 2016

(54) AXIAL CLUTCH ASSEMBLY AS WELL AS GAS SPRING AND GAS DAMPER ASSEMBLY AND METHOD INCLUDING SAME

(71) Applicant: Joshua R. Leonard, Noblesville, IN (US)

(72) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/346,749

(22) PCT Filed: Nov. 16, 2012

(86) PCT No.: PCT/US2012/065693
§ 371 (c)(1),
(2) Date: Mar. 24, 2014

(87) PCT Pub. No.: WO2013/075036
PCT Pub. Date: May 23, 2013

(65) Prior Publication Data
US 2015/0008627 A1 Jan. 8, 2015

Related U.S. Application Data

(60) Provisional application No. 61/560,801, filed on Nov. 16, 2011.

(51) Int. Cl.
*F16F 7/00* (2006.01)
*B60G 15/12* (2006.01)
(Continued)

(52) U.S. Cl.
CPC ............... *B60G 15/12* (2013.01); *B60G 13/04* (2013.01); *B60G 15/08* (2013.01); *B60G 17/052* (2013.01);
(Continued)

(58) Field of Classification Search
CPC ............ B60G 2202/152; B60G 2202/314; B60G 15/10; B60G 15/12; B60G 17/0521; F16F 9/0254; F16F 9/05; F16F 9/057; F16F 9/04; F16F 9/0472; F16F 9/049; F16F 9/052; F16F 7/09; F16F 7/095; F16F 13/005; F16F 13/04; F16F 2222/04
IPC ............................ B60G 15/12; F16F 9/05, 7/09
See application file for complete search history.

(56) References Cited

U.S. PATENT DOCUMENTS 1,019,504 A * 3/1912 McCombs ..................... 188/129
1,174,269 A * 3/1916 O'Connor ..................... 267/209
(Continued)

FOREIGN PATENT DOCUMENTS

DE 4327909 A1 * 3/1995 ............... B60G 9/02
FR 1051694 1/1954
(Continued)

OTHER PUBLICATIONS

International Search Report and Written Opinion for corresponding Patent Application No. PCT/US2012/065693 dated Mar. 28, 2013.

*Primary Examiner* — Stephen Bowes
(74) *Attorney, Agent, or Firm* — Thomas R. Kingsbury; Fay Sharpe LLP

(57) ABSTRACT

A gas spring and gas damper assembly can include a gas spring and a gas damper. The gas spring can include a first end member, a second end member and a flexible wall that at least partially form a spring chamber. The gas damper can include first, second and third damper elements that are telescopically interconnected with one another. The first and third damper elements can be operatively connected to respective ones of the first and second end members. The third damper element includes damper piston having an axial clutch. The second damper element is suspended between the first and third damper elements by biasing elements that engaging the damper piston.

19 Claims, 14 Drawing Sheets

(51) Int. Cl.
  *B60G 13/04* (2006.01)
  *B60G 15/08* (2006.01)
  *B60G 17/052* (2006.01)
  *F16F 7/09* (2006.01)
  *F16F 9/04* (2006.01)
  *B60G 17/08* (2006.01)
  *F16F 13/00* (2006.01)

(52) U.S. Cl.
  CPC . *B60G 17/08* (2013.01); *F16F 7/09* (2013.01); *F16F 9/0472* (2013.01); *F16F 13/002* (2013.01); *B60G 2202/152* (2013.01); *B60G 2202/23* (2013.01); *B60G 2202/242* (2013.01); *B60G 2202/314* (2013.01); *B60G 2206/80* (2013.01); *Y10T 29/49611* (2015.01)

(56) References Cited

U.S. PATENT DOCUMENTS

| | | | |
|---|---|---|---|
| 2,373,508 A | 4/1945 | Rush | |
| 2,497,829 A | 2/1950 | Baselt | |
| 2,690,818 A | 10/1954 | Janeway | |
| 2,982,510 A * | 5/1961 | Curriston et al. | 267/140.11 |
| 3,830,517 A * | 8/1974 | McNeill | 280/285 |
| 4,662,615 A * | 5/1987 | Paton | 267/64.24 |
| 4,955,467 A * | 9/1990 | Kallenbach | 188/381 |
| 6,286,820 B1 * | 9/2001 | Raulf et al. | 267/64.21 |
| 2010/0065993 A1 * | 3/2010 | Kondo | 267/64.16 |
| 2011/0140324 A1 * | 6/2011 | Naber | 267/140.13 |

FOREIGN PATENT DOCUMENTS

| | | | | |
|---|---|---|---|---|
| FR | 1086892 A | * | 2/1955 | F16F 7/09 |
| FR | 1096602 | | 6/1955 | |
| FR | 1464915 A | * | 3/1967 | B60G 15/12 |
| FR | 1483889 A | * | 6/1967 | F16F 7/09 |
| FR | 1563984 A | * | 4/1969 | F16F 7/09 |
| GB | 416857 A | * | 3/1934 | B64C 25/62 |
| GB | 787848 | * | 12/1957 | B64C 11/008 |
| GB | 881114 A | * | 11/1961 | B60G 11/27 |
| GB | 1072286 A | * | 6/1967 | B60G 11/22 |
| GB | 1284536 | | 8/1972 | |
| WO | WO-2009/124742 | | 10/2009 | |

* cited by examiner

AXIAL CLUTCH ASSEMBLY AS WELL AS GAS SPRING AND GAS DAMPER ASSEMBLY AND METHOD INCLUDING SAME

BACKGROUND

The present disclosure broadly relates to the art of spring devices and, more particularly, to a gas spring and gas damper assembly as well as a vehicle suspension system that includes such a gas spring and gas damper assembly and a method of operating such a gas spring and gas damper assembly.

A suspension system, such as may be used in connection with motorized vehicles, for example, can include one or more spring elements for accommodating forces and loads associated with the operation and use of the corresponding device (e.g., a motorized vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably influence the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Pat. No. 7,213,799. Generally, there is some resistance to the movement of pressurized gas through these passages or ports, and this resistance acts to dissipate energy associated with the gas spring portion and thereby provides some measure of damping.

One factor that may be limiting the broader adoption and use of gas spring and gas damper assemblies relates to the significant travel of which gas spring devices are capable. That is, gas spring devices are capable of being displaced between a minimum or compressed height and a maximum or extended height and the difference in these overall heights can be substantial.

Certain difficulties relating to the incorporation of gas dampers into gas spring devices have been associated with the aforementioned differences in overall height of gas spring devices. At one extreme, the minimum or compressed height of a gas spring device will act to limit the overall length of components that can be housed within the gas spring device. At the other extreme, any components housed within the gas spring device should remain operatively connected between the opposing end members of the gas spring device in the extended condition thereof.

Accordingly, it is desired to develop a gas spring and gas damper assembly as well as a suspension system and method of assembly that overcome the foregoing and other difficulties associated with known constructions.

BRIEF DESCRIPTION

One example of an axial clutch in accordance with the subject matter of the present disclosure that is dimensioned for use with an associated damper element having an associated damper rod and an associated damper piston can include at least one friction element disposed about the periphery of the associated damper piston and dimensioned for frictional engagement with an associated damper wall. First and second cam members can abuttingly engage the at least one friction element and can be operative vary the outside dimension of the axial clutch between an engaged condition having a first outside dimension and a disengaged condition having a second outside dimension that is less than the first outside dimension. In some cases, the first cam member can be disposed along one side of the associated damper piston and the second cam member can be disposed along the opposing side of the associated damper piston. A first biasing element can be operatively disposed between the first cam member and the one side of the associated damper piston, and a second biasing element can be operatively disposed between the second cam member and the opposing side of the associated damper piston. The first and second biasing elements can urge the first and second cam members axially-outwardly and into abutting engagement with the at least one friction element and can thereby generate a radially-outward force acting on the at least one friction element and thereby urging the at least one friction element into the first outside dimension, such as for fixedly engaging the associated damper wall. Upon application of an axial force to one of the first and second cam members in a direction toward the other of the first and cam second members, the radially-outward force generated by the first and second cam members can be reduced such that the at least one frictional element can be displaced to the second outside dimension, such as for slidably engaging the associated damper wall.

One example of a gas spring and gas damper assembly in accordance with the subject matter of the present disclosure can include a gas spring assembly and a gas damper assembly. The gas spring assembly can having a longitudinal axis, and can include a first end member and a second end member that is disposed in longitudinally-spaced relation to the first end member. A flexible wall can be secured between the first and second end members and can extend circumferentially about the longitudinal axis to at least partially define a spring chamber between the first and second end members. The gas damper assembly can be disposed within the spring chamber of the gas spring assembly and can be operatively connected between the first and second end members. The gas damper assembly can include a first damper element that is operatively connected to the first end member. The first damper element can include a first wall that at least partially defines a first damping chamber. A second damper element can include a first end received within the first damping chamber and an opposing second end that projects outwardly from the first damping chamber. The second damper element can include a second wall that at least partially defines a second damping chamber with the second damping chamber being accessible from outside the first damping chamber. The second damper element can be reciprocally displaceable in an approximately longitudinal direction with respect to the first damper element. A third damper element can include a first end that is operatively connected to the second end member and an opposing second end that is received within the second damping chamber of the second damper element. The third damper element can include a clutch element capable of selective operation between an engaged condition and a disengaged condition such that in the engaged condition the second end of the third damper element can be maintained in a substantially fixed position relative to the second side wall under axial forces below a predetermined force threshold and such that in the disengaged condition the second end of the third damper element can be capable of reciprocal movement with respect to the second side wall of the second damper element under axial forces below the predetermined force threshold.

Another example of a gas spring and gas damper assembly in accordance with the subject matter of the present disclosure can include a gas spring assembly and a gas damper assembly. The gas spring assembly can have a longitudinal axis and can include a first end member, a second end member that is spaced longitudinally from the first end member, and a flexible wall that extends circumferentially about the longitudinal axis and is operatively connected between the first and second end members such that a spring chamber is at least partially defined therebetween. The gas damper assembly can be disposed within the spring chamber and can be operatively connected between the first and second end members. The gas damper assembly can include a first damper element that is operatively connected to the first end member and can include a first side wall and a first end wall that at least partially define a first damping chamber. A second damper element can extend longitudinally between a first end and a second end that is opposite the first end. The second damper element can include a second end wall and a second side wall that at least partially defines a second damping chamber. The second end wall can be disposed transverse to the second side wall and can at least partially form a second element piston. The second damper element can be oriented such that the second element piston and at least a portion of the second side wall are disposed within the first damping chamber. The second damper element can be slidably supported within the first damping chamber such that the second end wall is displaceable relative to the first side wall of the first damper element. A third damper element can be operatively connected to the second end member and can include a damper rod and a third element piston disposed along the damper rod in spaced relation to the second end member. The third damper element can be oriented such that the third element piston and at least a portion of the damper rod are disposed within the second damping chamber. The third element piston can include an axial clutch that is variable between an engaged condition and a disengaged condition. The axial clutch can include at least one piston element disposed along the second side wall of the second damping element. The at least one piston element is capable of being biased into frictional engagement with the second side wall in the engaged condition of the axial clutch. The at least one piston element can be capable of being released into sliding engagement with the second side wall in the disengaged condition of the axial clutch.

One example of a method of assembling a gas spring and gas damper assembly in accordance with the subject matter of the present disclosure can include providing a first damper element that includes a first end wall and a first side wall that at least partially defines a first damping chamber. The method can also include providing a second damper element extending longitudinally between a first end and a second end opposite the first end. The second damper element can include an end wall and a second side wall that at least partially defines a second damping chamber. The end wall can be disposed transverse to the second side wall and can at least partially forming a second element piston. The method can further include positioning the second element piston and at least a portion of the second side wall within the first damping chamber such that the second damper element can be slidably supported within the first damping chamber and the second element piston can be displaceable relative to the first side wall of the first damper element. The method can also include providing a third damper element that can include a damper rod and a third element piston disposed along the damper rod. The third element piston including an axial clutch with at least one piston element disposed along the second side wall of the second damping element. The axial clutch being variable between an engaged condition and a disengaged condition such that the at least one piston element is capable of being biased into frictional engagement with the second side wall in the engaged condition of the axial clutch and such that the at least one piston element is capable of sliding engagement with the second side wall in the disengaged condition of the axial clutch. The method can further include placing the axial clutch of the third damper element into the disengaged condition and positioning the third damper element such that the third element piston and at least a portion of the damper rod are disposed within the second damping chamber. The method can further include providing a first end member, a second end member and a flexible wall. The method can also include securing the first damper element on the first end member and securing the third damper element on the second end member. The method can also include securing the flexible wall between the first and second end members such that a spring chamber is at least partially formed by the flexible wall between the first and second end member with the spring chamber containing at least the first, second and third damper elements.

DETAILED DESCRIPTION

Figure 1:
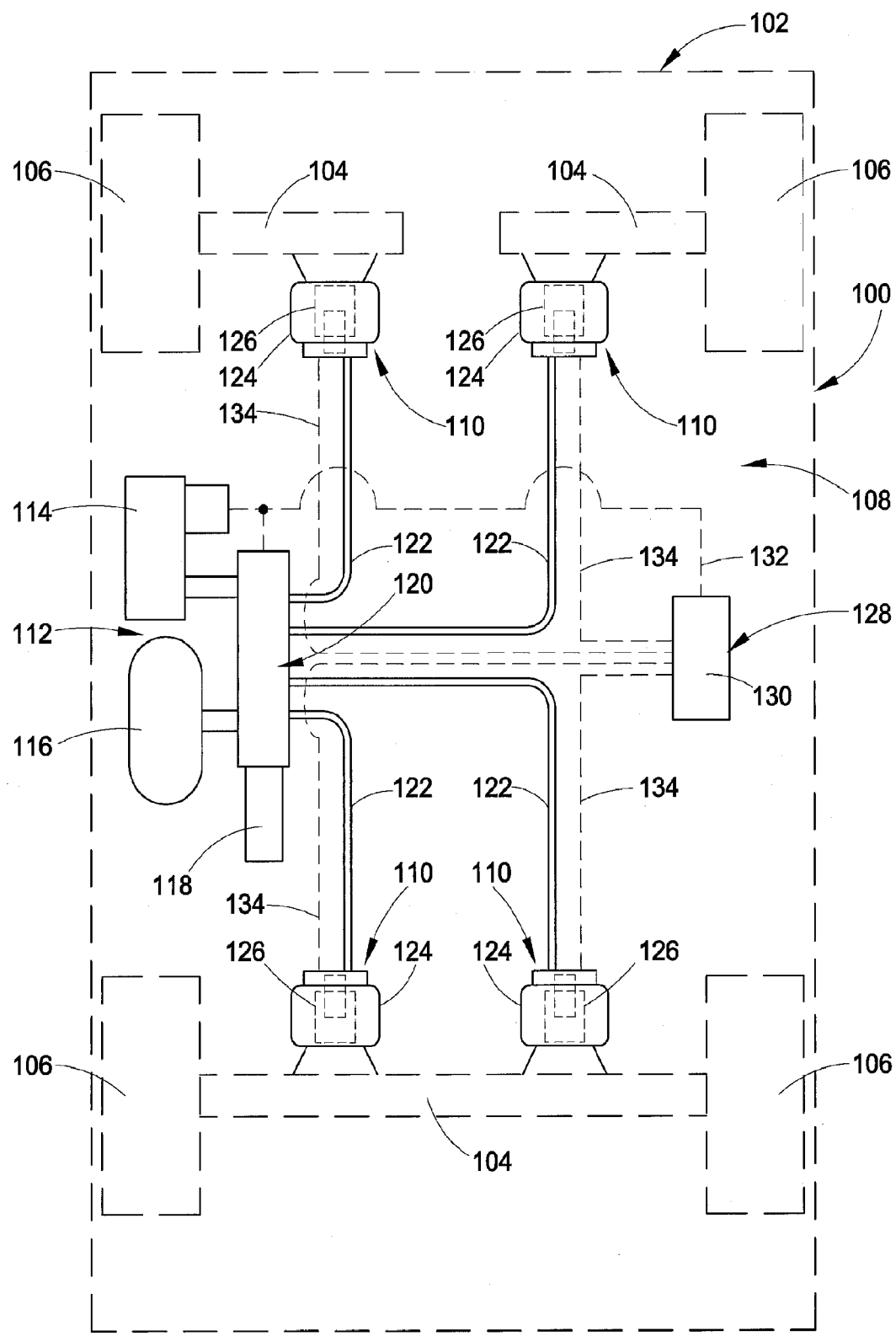
FIG. 1 is a schematic representation of one example of a vehicle including a suspension system utilizing gas spring and gas damper assemblies in accordance with the subject matter of the present disclosure.
Figure 2:
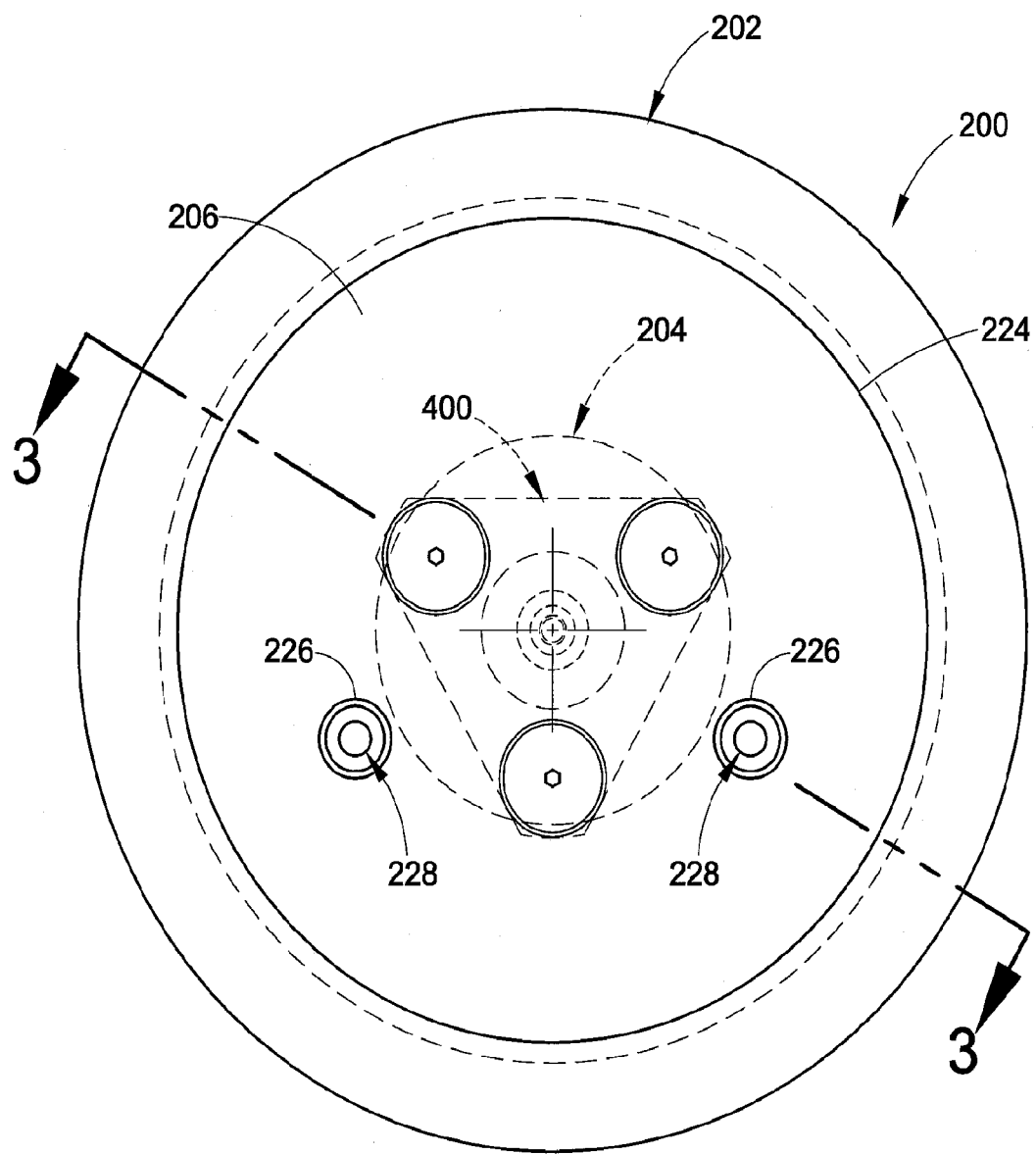
FIG. 2 is a top plan view of one example of a gas spring and gas damper assembly in accordance with the subject matter of the present disclosure.

Turning now to the drawings wherein the showings are for the purpose of illustrating exemplary embodiments of the present novel concept and not for limiting the same, FIG. 1 illustrates a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. The suspension system can include a plurality of gas spring and gas damper assemblies 110 that are operatively connected between the sprung and unsprung masses of the vehicle. Assemblies 110 can be disposed between the sprung and unsprung masses in any suitable manner, configuration and/or arrangement. For example, assemblies 110 are shown in FIG. 1 as being disposed adjacent wheels 106. Depending on desired performance characteristics and/or other factors, the suspension system may, in some cases, also include damping members (not shown) of a typical construction that are provided separately from assemblies 110 and secured between the sprung and unsprung masses in a conventional manner. In a preferred arrangement, however, gas spring and gas damper assemblies 110 will be sized, configured and operative to provide the desired performance characteristics for the suspension system without the use of additional damping members (e.g., conventional struts or shock absorbers) that are separately provided.

Vehicle 100 also includes a pressurized gas system 112 that is in communication with assemblies 110 and that is operative to selectively supply pressurized gas thereto and exhaust pressurized gas therefrom. Pressurized gas system 112 can include a pressurized gas source, such as a compressor 114, and can optionally include a storage vessel, such as a reservoir 116, for example, for receiving and storing pressurized gas, such as may be generated by the pressurized gas source. System 112 can further include a suitable exhaust, such as a muffler 118, for example, for venting pressurized gas from the system.

Pressurized gas system 112 can be in communication with the gas spring and gas damper assemblies in any suitable manner. For example, system 112 can include a valve assembly 120 or other suitable device or arrangement for selectively distributing pressurized gas to, from and/or between the pressurized gas source or sources, the exhaust and/or the gas spring and gas damper assemblies. As shown in the exemplary embodiment in FIG. 1, compressor 114, reservoir 116 and muffler 118 are in fluid communication with valve assembly 120 and can be selectively placed in fluid communication with one another by way of the valve assembly. Additionally, assemblies 110 are in fluid communication with valve assembly 120 by way of gas transmission lines 122 and, thus, can be selectively placed in communication with the compressor, reservoir, muffler and/or one another by way of the valve assembly.

It will be appreciated that gas spring and gas damper assemblies 110 can take any suitable form, configuration and/or construction in accordance with the present novel concept. In the embodiment shown in FIG. 1, each assembly 110 includes a gas spring assembly 124 and a gas damper assembly, which is schematically represented in FIG. 1 by item number 126, that is substantially-entirely contained within gas spring assemblies 124. Gas spring assemblies 124 include a spring chamber (not numbered) that is operative to receive and retain a quantity of pressurized gas. Gas damper assemblies 126 can include a plurality of components that are telescopically interconnected with one another and at least partially define a plurality of damping chambers. In some cases, one of the gas dampers can be at least partially received within the spring chamber of a gas spring assembly with one or more of the damping chambers being in fluid communication with the spring chamber of the gas spring assembly.

In operation of the exemplary embodiment shown in FIG. 1, valve assembly 120 can be selectively actuated to transfer pressurized gas from the compressor and/or reservoir to one or more of gas spring and gas damper assemblies 110 via one or more of gas transmission lines 122. Additionally, valve assembly 120 can be selectively actuated to exhaust pressurized gas from one or more of the gas spring and gas damper assemblies through the gas transmission lines, such as by way of muffler 118 or another suitable arrangement. It will be appreciated that the foregoing pressurized gas system and operation thereof are merely exemplary and that other suitable pressurized gas sources, systems and/or methods of operation could alternately be used without departing from the subject matter of the present disclosure.

Vehicle 100 also includes a suspension control system 128 for selectively operating, adjusting or otherwise influencing or controlling the performance or one or more suspension system components, such as gas spring and gas damper assemblies 110 and/or pressurized gas system 112, for example. Suspension control system 128 can include an electronic control unit 130 in communication with one or more components of valve assembly 120, such as through a communication line 132, for example, for selective actuation and/or operation thereof. Electronic control unit 130 is also shown in FIG. 1 as being in communication with suitable height sensing devices (FIGS. 3-6) that can optionally be used in association with gas spring and gas damper assemblies 110. It will be appreciated that such communications can be implemented in any suitable manner, such as by way of communication lines 134, for example. Additionally, it will be appreciated that height sensors or other distance-determining devices of any suitable type, kind, construction and/or configuration can be used, such as mechanical linkage sensors, ultrasonic wave sensors or electromagnetic wave sensors, for example. Additionally, other sensors, sensing devices and/or other such components can also, optionally, be used in connection with suspension control system 128, such as pressure sensors, accelerometers and/or temperature sensors, for example.

Figure 3:
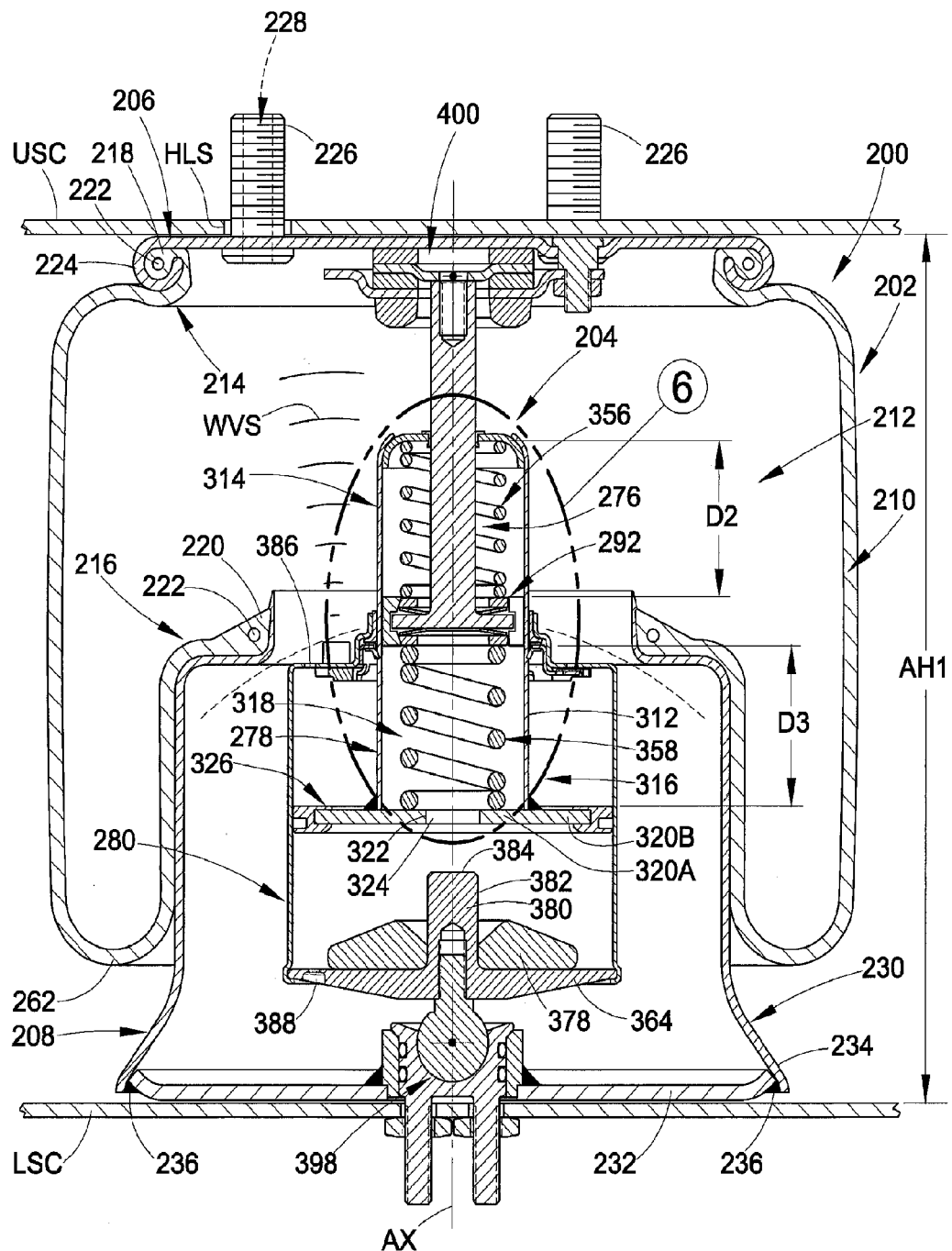
FIG. 3 is a cross-sectional side view of the gas spring and gas damper assembly in FIG. 2 taken from along line 3-3 thereof and shown in a normal height condition.
Figure 4:
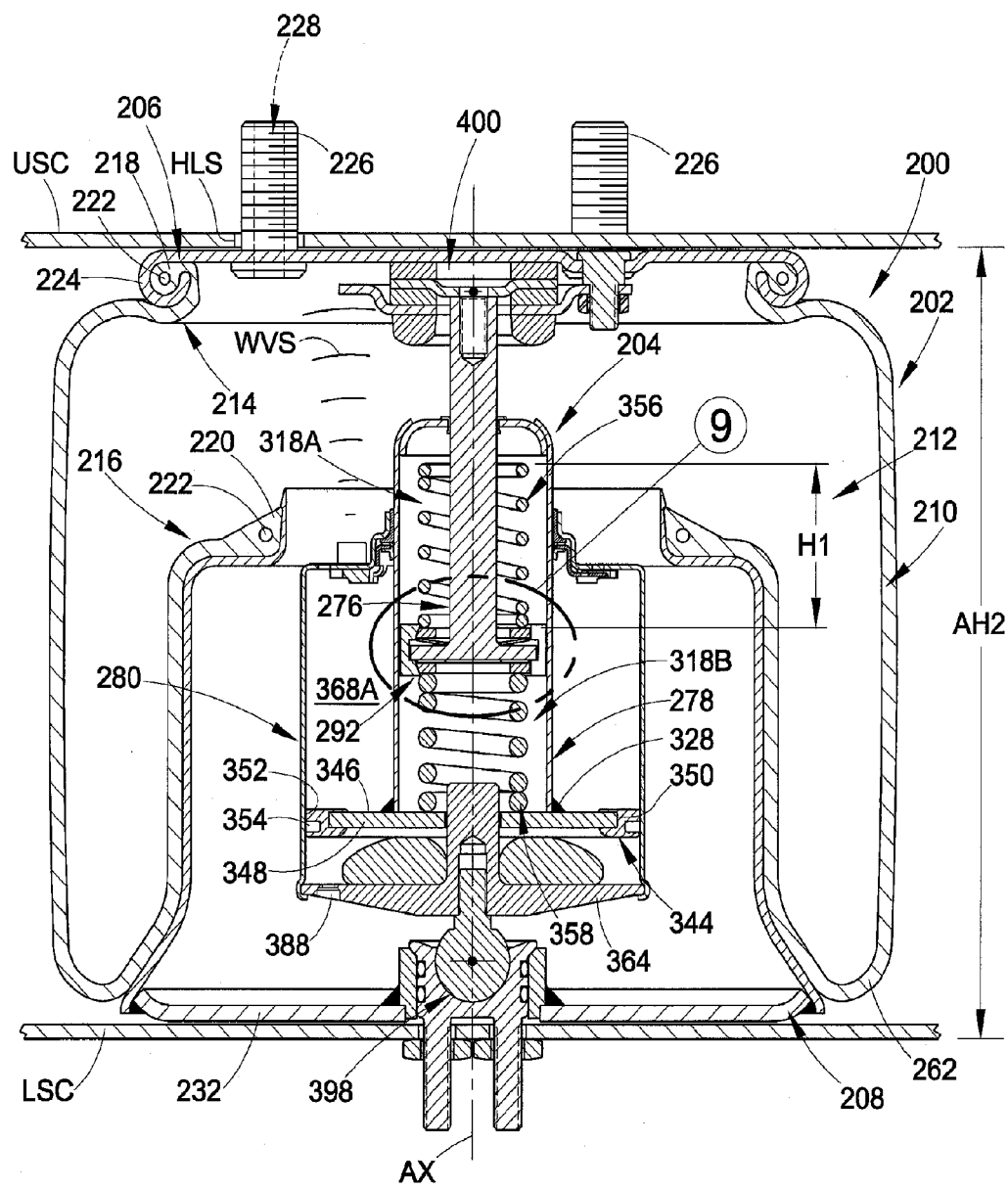
FIG. 4 is a cross-sectional side view of the gas spring and gas damper assembly in FIGS. 2 and 3 shown in a compressed condition.
Figure 5:
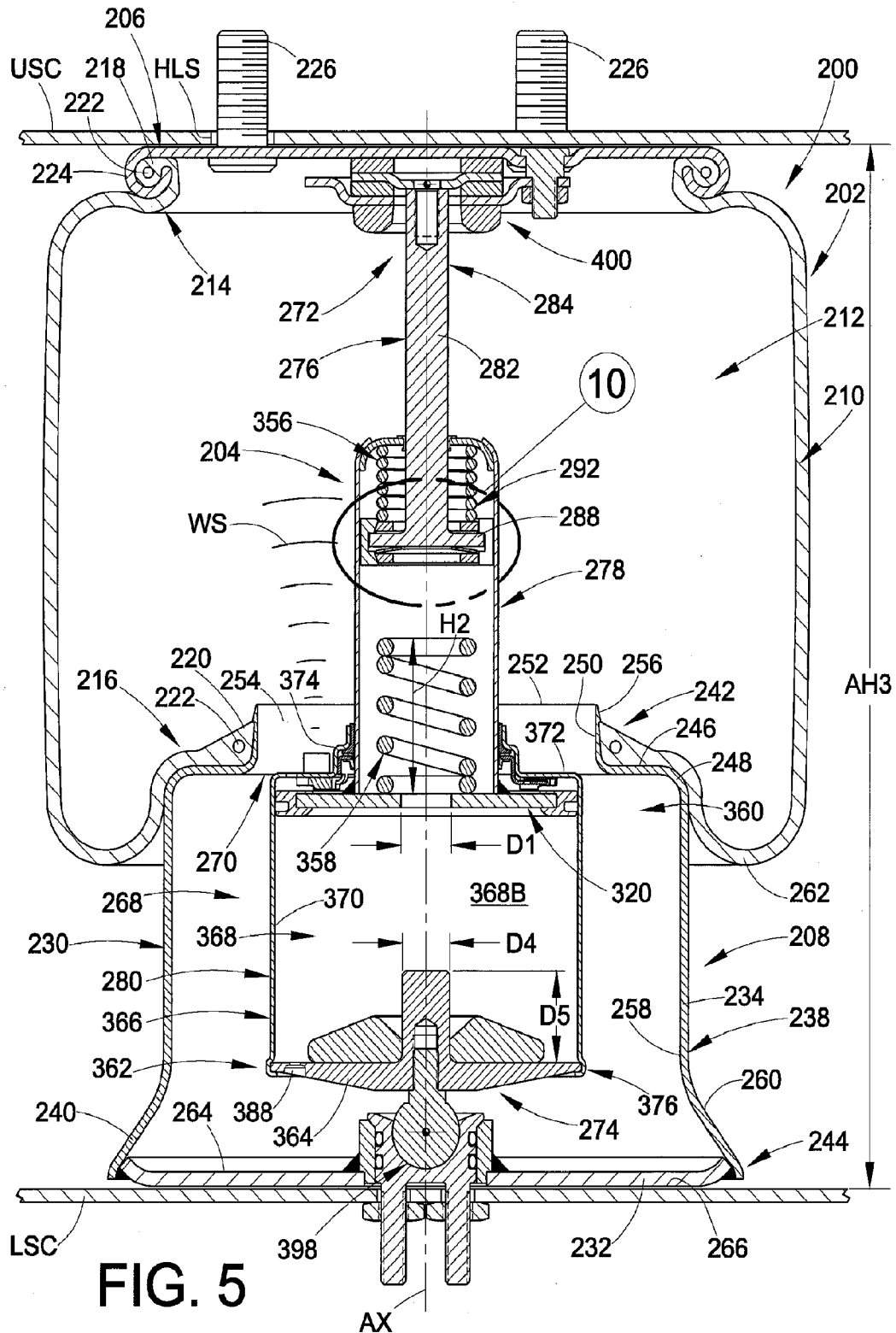
FIG. 5 is a cross-sectional side view of the gas spring and gas damper assembly in FIGS. 2-4 shown in an extended condition.

One example of a gas spring and gas damper assembly 200 in accordance with the subject matter of the present disclosure is shown in FIGS. 2-5. Gas spring and gas damper assembly 200 includes a gas spring assembly 202 and a gas damper assembly 204 that is substantially-entirely housed within the gas spring assembly. Gas spring assembly 202 can be of any type, kind, construction, configuration and/or arrangement, such as is shown in FIG. 1-5 as being of a rolling lobe-type construction, for example, and can have a longitudinal axis and can include a first end member, an opposing second end member spaced longitudinally from the first end member and a flexible wall that is operatively connected therebetween. It will be appreciated, however, that other gas spring assembly constructions could alternately be used, such as a convoluted bellow-type construction, for example. Additionally, gas spring assembly 202 can operatively connected between opposing structural components in any suitable manner, such as, for example, are generally represented in FIGS. 3-5 by upper structural component USC (e.g., vehicle body 102 in FIG. 1) and lower structural component LSC (e.g., axle 104 in FIG. 1).

In the exemplary arrangement shown in FIGS. 2-5, gas spring assembly 202 has a longitudinally-extending axis AX and includes a first or upper end member, such as a bead plate 206, for example, and an opposing second or lower end member, such as a piston 208, for example, that is spaced longitudinally from the first end member. A flexible wall, such as a flexible sleeve 210, for example, can be secured between the first end member (e.g., bead plate 206) and the second end member (e.g., piston 208) in a suitable manner such that a spring chamber 212 is at least partially formed therebetween.

Flexible sleeve 210 extends in a generally longitudinal manner between a sleeve end 214 and a sleeve end 216. Flexible sleeve 210 includes a mounting bead 218 along sleeve end 214 and a mounting bead 220 along sleeve end 216. Mounting beads 218 and 220 can optionally include a reinforcing element or other suitable component, such as a bead wire 222, for example.

End 214 of flexible sleeve 210 can be secured on or along the end member in any suitable manner. For example, mounting bead 218 of the flexible sleeve can be captured by an outer peripheral edge 224 of bead plate 206. The peripheral edge can be deformed around mounting bead 218 in any manner suitable for forming a substantially fluid-tight seal therewith. One or more securement devices, such as mounting studs 226, for example, can be included along bead plate 206 and project through the associated structural component (e.g., upper structural component USC) in a manner suitable for receiving a corresponding securement device or element (not shown) to secure the first end member to the associated structural component. In the exemplary embodiment shown in FIG. 3, mounting studs 226 project axially outwardly from the bead plate and extend through holes HLS in upper structural component USC.

Additionally, a fluid communication port, such as a fluid passage 228, for example, can optionally be provided on or along the first or upper end member to permit fluid communication with spring chamber 212. In the exemplary embodiment shown, fluid passages 228 extend through mounting studs 226 and are in fluid communication with the spring chamber. It will be appreciated, however, that any other suitable fluid communication arrangement could alternately be used.

Mounting bead 220 of flexible sleeve 210 can be secured to the second end member in any suitable manner. As one example, the mounting bead could be retained on or along the piston using one or more retaining elements or components (e.g., crimp rings or retaining caps). As another example, mounting bead 220 could be friction fit along a wall portion of piston 208 and, optionally, at least partially retained thereon using a radially outwardly-extending projection. It will be appreciated, however, that any other suitable arrangement and/or configuration could alternately be used.

In the exemplary embodiment in FIGS. 3-5, for example, piston 208 is shown as including piston body 230 (FIG. 3) that is formed from a base member 232 (FIG. 3) and an outer shell 234 (FIG. 3) which is operatively connected to the base member such that a substantially fluid-tight seal is formed therebetween, such as through the use of a flowed-material joint 236 (FIG. 3) extending circumferentially about axis AX, for example. It will be appreciated, however, that in other cases, a piston body could be used in which the base member and outer shell are integrally formed with one another, such as through the use of an injection molding process, for example. In such case, the base member could be alternately referred to as a base portion or base member portion, and the outer shell could be alternately referred to as an outer shell portion.

As identified in FIG. 5, outer shell (or outer shell portion) 234 includes a shell wall 238 that extends circumferentially about axis AX. Shell wall 238 includes an outer side wall portion 240 that extends in a generally longitudinal direction between an end 242, which is disposed toward bead plate 206, and an end 244, which is disposed in longitudinally spaced relation to end 242 and toward lower structural component LSC. Shell wall 238 also includes an end wall portion 246 that transitions into outer side wall portion 240 at a curved or shoulder portion 248. An inner side wall portion 250 projects from end wall portion 246 in a direction extending axially away from end 244. Inner side wall portion 250 terminates in the axial direction at an end 252. Additionally, inner side wall portion 250 includes an outer surface (not numbered) facing radially outward and an inner surface 254 facing radially inward. A projection 256 extends radially-outwardly from along the outer surface adjacent end 252 of inner side wall portion 250.

It will be recognized that a wide variety of shapes, profiles and/or configurations can and have been used in forming the outer side wall of a gas spring piston. As such, it will be appreciated that outer side wall portion 240 of shell wall 238 can be of any suitable shape, profile and/or configuration and that the profile shown in FIGS. 3-5 is merely exemplary. Mounting bead 220 of flexible sleeve 210 can be received on or along the outer surface of inner side wall portion 250 such that a substantially fluid-tight seal is formed therebetween with projection 256 at least partially retaining mounting bead 220 on inner side wall portion 250. Additionally, outer side wall portion 240 of shell wall 238 includes an inside surface 258 and an outside surface 260. As such, a portion of flexible sleeve 210 extends along end wall portion 246 and outside surface 260 of outer side wall portion 240 such that a rolling lobe 262 is formed along piston body 230 and is displaced along the outer side wall portion as the gas spring assembly undergoes changes in overall height.

As identified in FIG. 5, base member 232 includes an inside surface 264 and an outside surface 266, which can be disposed in abutting engagement with lower structural component LSC. Inside surface 264 of base member 232 and inside surface 258 of outer side wall portion 240 at least partially define a piston chamber 268 within piston 208. Inner surface 254 of inner side wall portion 250 at least partially defines an opening or passage 270 into piston 208 by which piston chamber 268 is in fluid communication with spring chamber 212. In a preferred arrangement, inner surface 254 defines an opening or passage (e.g., passage 270) into piston chamber 268 that is of sufficient size to permit piston chamber 268 and spring chamber 212 to operate as a substantially unified fluid chamber. That is, in a preferred arrangement, passage 270 will be sufficiently large that minimal fluid flow restriction (e.g., approximate zero fluid flow restriction) will occur for pressurized gas flowing between spring chamber 212 and piston chamber 268 under typical conditions of operation.

Gas damper assembly 204 is shown in FIGS. 2-5 as being substantially entirely contained within gas spring assembly 202 and extending longitudinally between an end 272 (FIG. 5) that is operatively connected to bead plate 206 and an end 274 (FIG. 5) that is operatively connected to piston 208. Gas damper assembly 204 includes a plurality of damper elements that are operatively interconnected with one another for telescopic extension and compression in relation to corresponding extension and compression of gas spring assembly 202.

In the exemplary arrangement in FIGS. 3-10, gas damper assembly 204 is shown as including damper elements 276, 278 and 280 that are operatively interconnected with one another for telescopic extension and compression. Damper element 276 is operatively connected to the first end member (e.g., bead plate 206) and extends from the first end member toward the second end member (e.g., piston 208). Damper element 280 is operatively connected to the second end member (e.g. piston 208) and extends from the second end member toward the first end member (e.g., bead plate 206). Damper element 278 is disposed longitudinally between damper elements 276 and 280, and is operatively interconnected therewith such that damper elements 276 and 278 can move relative to one another and such that damper element 278 and 280 can move relative to one another.

Figure 6:
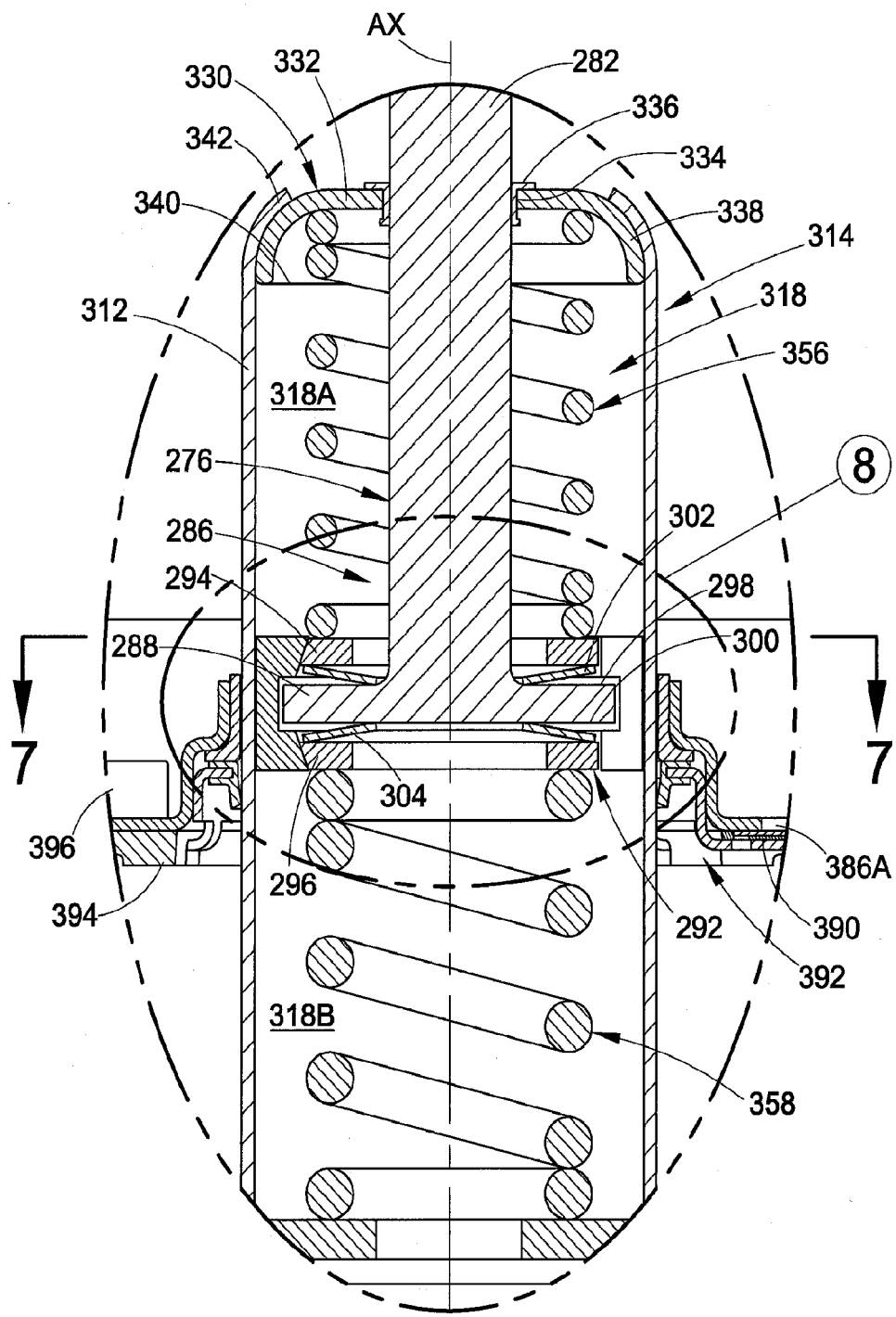
FIG. 6 is an enlarged, cross-sectional side view of the portion of the gas spring and gas damper assembly in FIGS. 2-5 identified as Detail 6 in FIG. 3.
Figure 7:
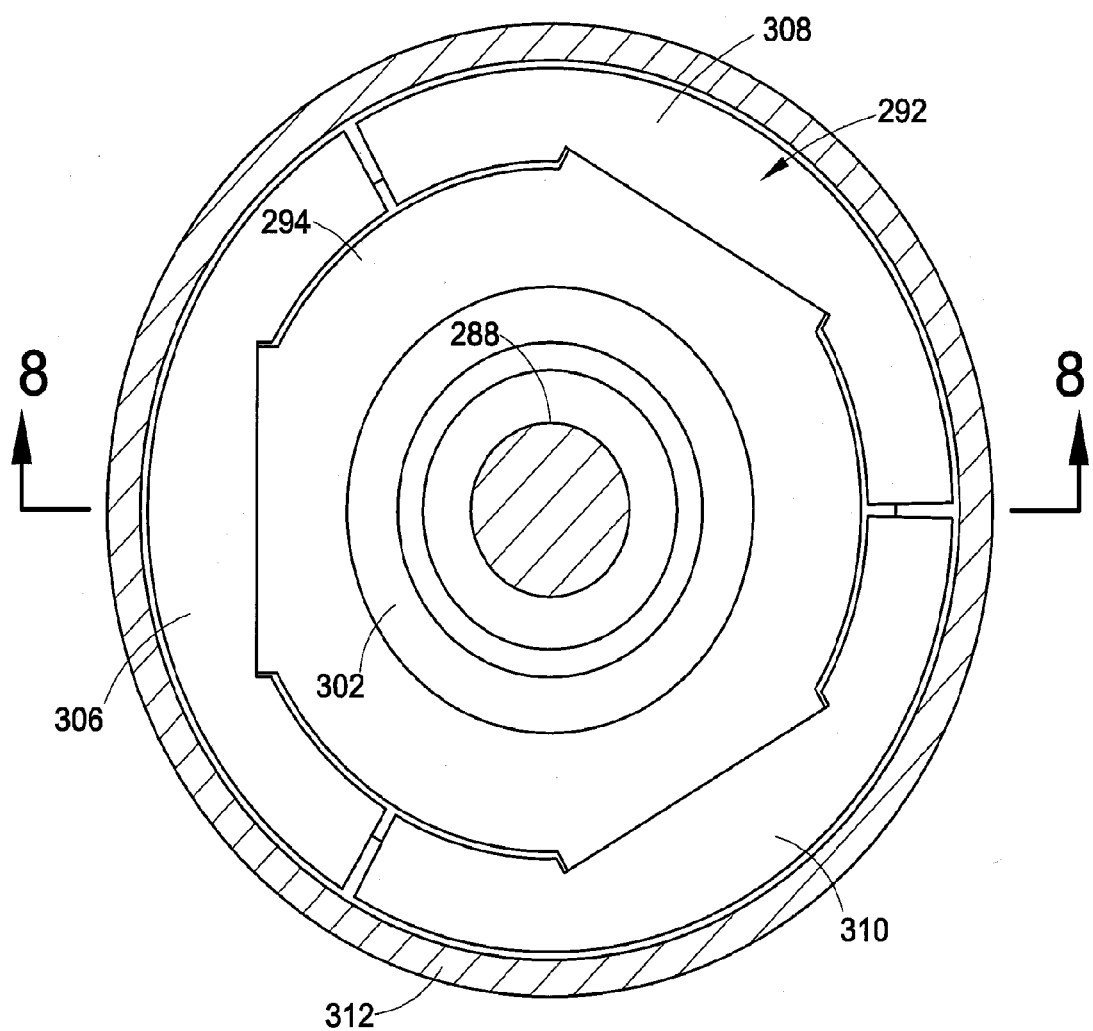
FIG. 7 is a cross-sectional top view of a portion of the gas damper assembly in FIGS. 2-6 taken from along line 7-7 in FIG. 6.

As identified in FIG. 5, damper element 276 includes a damper rod 282 that extends longitudinally from an end 284 to an end 286 (FIG. 6). A damper piston 288 is disposed along end 286 of damper rod 282 and can be attached or otherwise connected thereto in any suitable manner. For example, in a one arrangement, damper piston 288 is integrally formed with damper rod 282 from a unitary mass of material (e.g., metal material, such as steel or aluminum, for example). In such case, a fillet 290 (FIG. 8) having a generous radius can be formed between damper rod 282 and damper piston 288. Such an arrangement can provide an improved stress distribution and force transfer to, from and between the damper rod and the damper piston.

Additionally, damper element 276 can, optionally, include a piston stop (not shown) that projects axially outwardly beyond damper piston 288, which may also be referred to herein as a damper piston wall, in a direction opposite damper rod 282. It will be appreciated that, if formed from a unitary mass of material, damper element 276 can be manufactured or otherwise produced in any suitable manner and/or through the use of any suitable processes. For example, damper element 276 could be formed from a unitary mass of steel material through the use of a cold-heading process. Alternately, other materials and/or processes could be used, such as impact extrusion and/or hot forging processes. Additional features, such as rod mounting threads, rod seal elements, wear-band glands, anti-rotation features and/or drive features, such as non-circular (e.g., hex-shaped) male and/or female drive features, for example, can optionally be included. Material treatments and/or coatings can also be included on or along one or more portions of the damper elements (e.g., damper elements 276, 278 and/or 280).

Damper element 276 also includes an axial clutch 292 formed on or along end 286 of the damper element, and can include any suitable configuration and/or arrangement of components for maintaining a substantially-fixed relative position between damper elements 276 and 278 at axial loads below a predetermined force threshold and permitting relative movement between damper elements 276 and 278 at axial loads equal to or exceeding the predetermined force threshold. Axial clutch 292 is also operative to re-engage or otherwise re-establish a substantially-fixed positional relationship between damper elements 276 and 278 upon abatement of forces acting on gas damper assembly 204 that are equal to or exceed the predetermined force threshold.

In a preferred arrangement, axial clutch 292 is disposed along damper piston 288 and can at least partially form a damper piston assembly (not numbered). Axial clutch 292 includes at least one actuator and at least one friction element, which may also be referred to herein as a piston element, that is operatively associated with the at least one actuator for selective engagement and disengagement with damper element 278. As identified in FIGS. 6-10, axial clutch 292 includes cam members 294 and 296 that are disposed along opposing sides 298 and 300 of the damper piston. A plurality of biasing elements can be included, such as biasing elements 302 and 304, with at least one biasing element disposed between the damper piston and each of the cam members. In the exemplary arrangement shown, biasing element 302 is operatively disposed between side 298 and cam member 294 with biasing element 304 operatively disposed between side 300 and cam member 296. Additionally, the at least one damper element can include one or more friction elements or shoes 306-310 (FIG. 7) that are disposed circumferentially about the damper piston and/or the cam members, and are radially displaceable outwardly and inwardly between first and second outside dimensions OD1 (FIG. 8) and OD2 (FIG. 9), such as may result in the respective engagement and disengagement of the one or more friction elements with a surface or wall of the associated damper element (e.g., damper element 278). In this respect, the one or more friction elements or shoes can transition between a substantially fixed engagement with the surface or wall of the associated damper element and a sliding engagement with the surface or wall of the associated damper element.

As identified in FIG. 3, damper element 278 includes a side wall 312 extending circumferentially about axis AX between longitudinally-spaced ends 314 and 316 such that a longitudinally-extending damping chamber 318 is at least partially formed by side wall 312. Damper element 278 can also include a piston base wall 320 (FIG. 5) that is disposed transverse to axis AX. In some cases, a portion 320A of piston base wall 320 can, optionally, extend across an open end (not numbered) of side wall 312 to at least partially define damping chamber 318. A piston passage wall 322 can at least partially define a piston passage 326 that extends through portion 320A of piston base wall 320. It will be appreciated that piston passage 324 can be of any suitable size, shape and/or configuration, such as may be suitable for permitting fluid transfer into and out of damping chamber 318. Piston passage 324 is shown in FIG. 5 as having a cross-sectional size or dimension, as is represented by reference dimension D1. In a preferred arrangement, piston passage 324 is of sufficient size to permit complimentary components and/or features, such as the optional piston stop (not shown) of damper element 276, for example, to fit into and out of the piston passage and thereby extend through piston base wall 320.

Another portion 320B of piston base wall 320 can extend radially-outwardly beyond side wall 312 to at least partially form a damper piston 326 along end 316 of damper element 278. It will be appreciated that piston base wall 320 can be secured on or along side wall 312 in any suitable manner, such as through the use of a flowed-material joint 328 (FIG. 4), for example. In a preferred arrangement, a substantially fluid-tight connection can be formed between the side wall and the piston base wall.

As identified in FIG. 6, damper element 278 can also include an end cap 330 that is disposed along end 314 and extends across an open end (not numbered) of side wall 312 to thereby further enclose and define damping chamber 318. End cap 330 is shown as including an end wall portion 332 with a passage wall 334 that at least partially defines a rod passage (not numbered) extending through the end wall. A bearing element and/or sealing element can, optionally, be included within or otherwise along the rod passage for abuttingly engaging damper rod 282 of damper element 276. In the exemplary arrangement shown in FIGS. 3-6, a bushing 336 is disposed within the rod passage and secured along end wall portion 332. End cap 330 also includes an outer peripheral wall portion 338 that terminates at a distal edge 340. In the exemplary arrangement shown in FIGS. 3-6 outer peripheral wall portion 338 has a curved cross-sectional profile. It will be appreciated, however, that other profiles and/or configurations could alternately be used.

In some cases, end cap 330 can be formed as a metal stamping, such as a stamped steel or aluminum construction, for example. Additionally, side wall 312 can be formed from a malleable metal material, such as steel or aluminum, for example. In such case, a retaining portion 342 of side wall 312 can be deformed radially-inwardly to abuttingly engage or otherwise at least partially conform with outer peripheral wall portion 338 of end cap 330 to thereby retain the end cap within the open end of the side wall. Alternately, a flange could be formed along the open end of the side wall, and the end cap could be crimped or otherwise formed outwardly over the flange for securement to the side wall.

It has been recognized that conventional piston-cylinder arrangements often include a piston having a sealing element to reduce fluid transfer from one side of the piston to the other and a bearing to support radial loads. Known designs can result in increased thickness of the piston, which can, in some cases, limit the available stroke of such known piston-cylinder arrangements. Additionally, endless grooves, which are sometimes referred to as glands, are often included to receive and retain one or more sealing elements and/or radial bearings, such as wear bands, for example. In conventional constructions, pistons are often formed from a material having a relatively high strength, such as metal (e.g., steel or aluminum), for example, to withstand the axial and/or radial loads associated with the operation and use of the piston-cylinder arrangement. In such cases, the grooves (or glands) are often machined or otherwise formed into the piston, which can undesirably result in increased costs and/or time associated with manufacturing as well as other factors, such as increased material mass to accommodate such features, for example.

As identified in FIG. 4, damper piston 326 of damper element 278 can also include an outer piston wall 344 that can be operatively connected to piston base wall 320 in any suitable manner. In the exemplary arrangement shown in FIGS. 3-5, piston base wall 320 has opposing side surfaces 346 and 348, and terminates at an outer edge wall 350. Outer piston wall 344 extends radially-outwardly beyond outer edge wall 350 and thereby forms an outermost edge 352 of damper piston 326. Outer piston wall 344 extends axially-outwardly beyond side surfaces 346 and 348, and extends radially inwardly along the side surfaces to abuttingly engage the side surfaces for retainment of outer piston wall 344 on and along piston base wall 320 to thereby form damper piston 326. One or more grooves or other features can also be formed on or along the outer piston wall. For example, a radially-inwardly extending groove 354, such as may be suitable for receiving a sealing element (not shown) and/or a bearing element (not shown), for example, is shown extending endlessly around the outer piston wall along outermost edge 352. It will be appreciated, however, that other arrangements and/or configurations could alternately be used.

The aforementioned construction of damper piston 326 can assist in minimizing overall piston thickness, and may thereby increase stroke and/or strength and/or may reduce mass and/or manufacturing costs. As can be observed from FIGS. 3-5, a relatively thin piston base wall can be used as a result of including the outer piston wall, which can function as a bearing and/or wear ring as well as incorporate the seal gland for receiving and retaining a sealing element. It will be appreciated that outer piston wall 344 can be secured on or along piston base wall 320 in any suitable manner. As one example, the outer piston wall could be formed by injection molding the outer piston wall over the piston base wall. Alternately, the outer piston wall could be formed as one or more components that are secured to the piston base wall in a suitable manner, such as through the use of a flowed-material joint, fasteners and/or snap features, for example. Furthermore, outer piston wall 344 can be formed from any suitable material or combination of materials. As one example, the outer piston wall can be formed from or otherwise include a polymeric material, such as nylon, for example, that includes a dry lubricant, such as molybdenum disulfide, for example.

As discussed above, damper elements 276 and 278 are operatively interengaged with one another for telescopic extension and compression. In the exemplary arrangement shown, damper piston 288 and axial clutch 292 are disposed within damping chamber 318 and damper rod 282 extends out of damping chamber 318 through the rod passage (not numbered) that is at least partially defined by passage wall 334. As such, end 284 of damper rod 282 is disposed outwardly of damping chamber 318 and can be operatively connected along bead plate 206 in a suitable manner, such as will be described in additional detail hereinafter.

Damping chamber 318 is separated by damper piston 288 and axial clutch 292 into chamber portions 318A and 318B (FIG. 4). In some cases, it may be desirable to maintain the chamber portions in fluidic isolation from one another, such as by including one or more sealing elements (not shown) operatively disposed between the damper piston and the side wall. Additionally, or in the alternative, it may be desirable to include one or more sealing elements (not shown) between damper rod 282 and passage wall 334, such that a substantially fluid-tight seal is formed therebetween and such that damping chamber 318 and spring chamber 212 are fluidically isolated from one another through the rod passage. In such cases, additional fluid communication ports (not shown) can be selectively provided in one or more of damper piston 288, end cap 330 and/or a central portion 320A of piston base wall 320. Such additional fluid communication ports can be sized and configured to generate damping forces during relative movement between damper element 276 and damper element 278.

Gas damper assembly 204 can also include at least one biasing element disposed within damping chamber 318 and can be operative to act between damper piston 288 and end cap 330 and/or central portion 320A of piston base wall 320. In the exemplary arrangement shown in FIGS. 3-6 and 8-10, two biasing elements are included. Biasing element 356 is disposed within chamber portion 318A and is operative to act on and between damper piston 288 and end cap 330. Biasing element 358 is disposed within chamber portion 318B and is operative to act on and between damper piston 288 and central portion 320A of piston base wall 320. One benefit of including a biasing element, such as biasing element 316 and/or 318, for example, within one or both of the chamber portions (e.g., chamber portions 300A and 300B) is that the biasing element can act as a bumper or cushion that impedes sudden impacts between damper piston 288 and/or axial clutch 292 and a corresponding one of end cap 330 and/or central portion 320A of piston base wall 320.

Another benefit of including a biasing element, such as biasing element 356 and/or 358, for example, within one or both of the chamber portions (e.g., chamber portions 318A and 318B) is that the biasing element(s) can act to establish and/or control the longitudinal position of damper element 278 relative to other components of the gas damper assembly, as will be discussed in greater detail hereinafter. Additionally, during operation, the longitudinal forces acting between damper element 276 and damper element 278 will deflect biasing elements 356 and 358 to varying degrees and in various manners, as will be described in greater detail hereinafter. It will be appreciated that a biasing force threshold will correspond with or otherwise have a relation to the spring rate of the one or more biasing elements (e.g., biasing elements 356 and/or 358). As such, it will be recognized that where two biasing elements are used, such as biasing elements 356 and 358, for example, the biasing elements could have different spring rates, such as, for example, by using different materials or combinations of materials for the biasing elements and/or by using different sizes, dimensions and/or proportions for the biasing elements.

A benefit of including both of biasing elements 356 and 358 is that the biasing elements can be used as actuation devices for triggering the actuation of an axial clutch, such as axial clutch 292, for example. In such case, biasing element 356 can be disposed within chamber portion 318A and can abuttingly engage cam member 294 and end cap 330. Biasing element 356 is shown as including a first height, which is represented in FIG. 4 by reference dimension H1, and has a first spring rate, such as, for example, may be established or otherwise at least partially defined by the material (or combination of materials) from which the biasing element is formed and/or by the size, shape and/or proportions of the biasing element. Additionally, biasing element 358 is disposed within chamber portion 318B and abuttingly engages cam member 296 and central portion 320A of piston wall 320. Biasing element 358 is shown as including a second height, which is represented in FIG. 5 by reference dimension H2, and has a second spring rate, such as, for example, may be established or otherwise at least partially defined by the material (or combination of materials) from which the biasing element is formed and/or by the size, shape and/or proportions of the biasing element.

In some cases, the first and second spring rates may be approximately equal to one another. In other cases, however, the first and second spring rates may be different from one another such that the first spring rate is either greater or less than the second spring rate, as may be desirable for a particular application and/or use. For example, biasing elements 356 and 358 are shown in FIGS. 3-6 and 8-10 as being coil springs having approximately the same outside diameter but being formed from wire having different cross-sectional dimensions and a different number of coils. Examples of other suitable materials that could be used can include elastomeric polymers, such as foamed and unfoamed polyurethane, foamed and unfoamed natural rubber, and foamed and unfoamed synthetic rubber, such as in the form of open-cell or closed-cell spring elements as well as metals, such as steel coil springs, for example.

As indicated above, biasing element 356 is shown as having a height H1 and biasing element 358 is shown as having a height H2 that is different from height H1. It will be appreciated that heights H1 and H2 represent the free heights of the biasing elements. As such, at the design height of gas spring and gas damper assembly 200, such as is shown in FIG. 3, for example, it will be recognized that end cap 330 is disposed a first distance from cam member 294, which first distance is represented in FIG. 3 by reference dimension D2 that is less than height H1 of biasing element 356. Additionally, central portion 320A of piston base wall 320 is disposed a second distance from cam member 296, which second distance is represented in FIG. 3 by reference dimension D3 and is less than height H2 of biasing element 358. In some cases, one of the distances may be greater than the other distance. For example, central portion 320A of piston wall 320 could be longitudinally positioned nearer to one of the cam members (e.g., cam member 296) and end cap 330 could be longitudinally positioned further from the other of the cam members (e.g., cam member 294). It will be appreciated, however, that the cam members could alternately be longitudinally positioned approximately centrally between the end cap and the central portion of the piston base wall, or the end cap could be nearer to one cam member and the central portion of the piston base wall could be further from the other cam member. In any of these cases, however, it will be recognized and appreciated that, in an assembled condition, the biasing elements are at a compressed height that is less than free heights H1 and H2. As such, it will be understood that, in a preferred arrangement, a force or load that is approximately equivalent to the product of the deflection (i.e., the distance between the free height and the compressed height) biasing element and the spring rate will be acting on cam members 356 and 358. In some cases, this force or load may correspond with or otherwise have a relation to a predetermined force threshold that is associated with the actuation of axial clutch 292.

Figure 9:
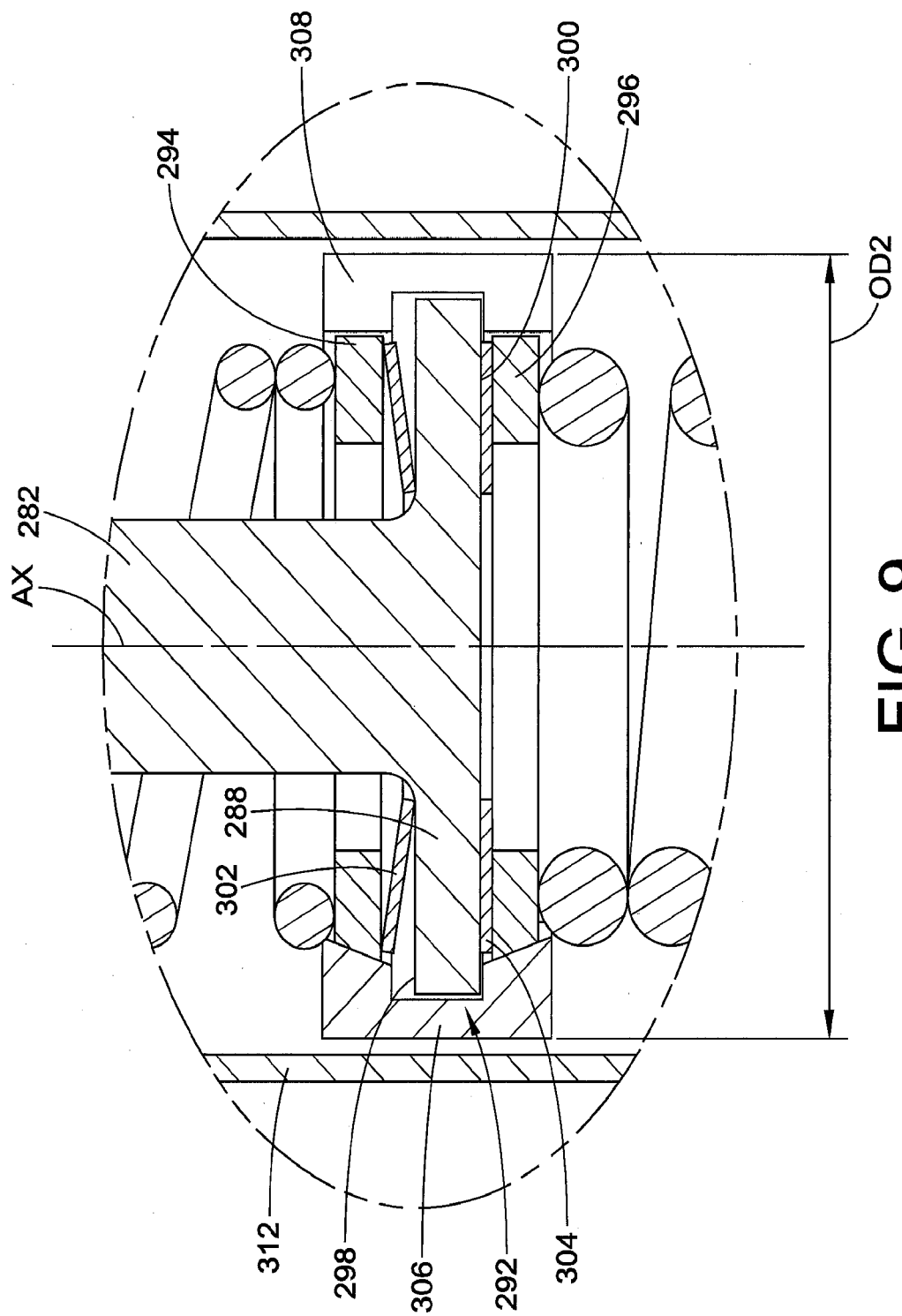
FIG. 9 is an enlarged, cross-sectional view of the portion of the gas damper assembly identified as Detail 9 in FIG. 4 and illustrating a disengaged condition.

As identified in FIG. 5, damper element 280 is shown in FIGS. 3-6 as extending longitudinally between opposing ends 360 and 362 and including an end wall 364 disposed along end 360 and housing wall 366 that is secured to end wall 364 and at least partially defines a damping chamber 368 therebetween. End wall 364 can be operatively connected on or along the second end member (e.g., piston 208) in a suitable manner. As illustrated in FIG. 9, for example, housing wall 366 is shown as including a side wall portion 370 extending longitudinally from along end wall 364 toward an end wall portion 372 of the housing wall. End wall portion 372 of housing wall 366 includes a passage wall portion 374 that at least partially defines a damper passage (not numbered) extending therethrough. End wall 364 and housing wall 366 can be operatively connected to one another in any suitable manner. For example, a threaded connection (not shown) or a flow-material joint (not shown) could be used. Alternately, as shown in FIG. 9, a crimped or other deformed-material joint 376 could be used. In some cases, it may be desirable to form a substantially fluid-tight connection between the end wall and the housing wall. In other cases, a less fluid-tight connection could be used, such as a deformed-material joint, for example.

As discussed above, damper elements 278 and 280 are operatively interengaged with one another for telescopic extension and compression. In the exemplary arrangement shown, a portion of damper element 278 is disposed within damping chamber 368 such that at least a portion of side wall 312 and end cap 330 of damper element 278 extend longitudinally-outwardly of damping chamber 368 through the damper passage (not numbered) that is at least partially defined by passage wall portion 374. As such, end 314 of damper element 278 is disposed outwardly of damping chamber 368 and end 316 of damper element 278 is disposed within damping chamber 368, such that damper piston 326 extends radially-outwardly toward side wall portion 370 of housing wall 366 and separates damping chamber 368 into chamber portions 368A (FIG. 4) and 368B.

In some cases, it may be desirable to permit fluid communication between chamber portions 368A and 368B, such as by including one or more friction-reducing bushings or wear bands disposed along the interface between side wall 312 and passage wall portion 374 of housing wall 366 and/or along the interface between outer piston wall 344 and side wall portion 370 of housing wall 366. In a preferred embodiment, however, chamber portions 368A and 368B are maintained in fluidic isolation from one another, such as by including one or more sealing elements operatively disposed between side wall 312 and passage wall portion 374 of housing wall 366. Additionally, such a preferred arrangement can include one or more sealing elements (not shown) disposed between outer piston wall 344 and side wall portion 370 of housing wall 366 such that a substantially fluid-tight seal is formed therebetween.

As discussed above, damper elements 278 and 280 are operatively interengaged with one another for telescopic extension and compression. As such, damper piston 326 of damper element 278 moves toward and away from end wall 364 of damper element 280 during operation and use of the gas damper assembly. A bumper or other cushioning element can, optionally, be disposed within either or both of chamber portions 368A and/or 368B such as may be useful to prevent or at least minimize the possibility of direct physical contact between damper piston 326 of damper element 278 and end wall 364 and/or end wall portion 372 of housing wall 366. As shown in FIGS. 3-5, a bumper 378 is disposed within chamber portion 368B and is supported along and secured to end wall 364 of damper element 280. It will be appreciated, however, that any other suitable arrangement could alternately be used. For example, the bumper could alternately be secured on along piston base wall 320 of damper element 278.

End wall 364 can also include a piston stop 380 that projects axially outwardly from along end wall 364 toward end 360 of damper element 280. Piston stop 380 is at least partially defined by an outer side wall 382 and an end wall 384. Outer side wall 382 can be of any suitable shape and/or configuration, such as cylindrical, for example. And, outer side wall 382 can be of any suitable cross-sectional size or dimension, such as is represented in FIG. 5 by reference dimension D4. Outer side wall 382 can extend outwardly in a direction toward end 360 by a predetermined distance, such as is represented in FIG. 5 by reference dimension D5. In a preferred arrangement, piston stop 380 is of suitable size, such as is represented by dimension D4, and suitable length, such as is represented by dimension D5, to fit into and out of piston passage 326 and thereby extend through piston base wall 320, such as is illustrated in FIG. 4, for example. In such case, damper element 276 (or an end wall of a piston stop thereof, if included) and end wall 384 of piston stop 380 can abuttingly interengage one another and thereby transfer loads and/or forces from damper element 276 to end wall 364 of damper element 280 without transferring loads and/or forces directly through the interconnection between end wall 364 and housing wall 366. Additionally, such a construction may be useful in avoiding the application of a load associated with the full displacement of the damper elements to bumper 378. Though shown as being integrally formed with end wall 364, piston stop 380 could be separately provided and secured on or along the end wall using a suitable securement arrangement, such as a threaded fastener connection, a snap-fit connection or a press-fit connection, for example.

As discussed above, sealing elements can be respectively disposed between side wall 312 and passage wall portion 374 of housing wall 366 and between piston wall 320 and side wall portion 370 of housing wall 366, such that a substantially fluid-tight seals are formed therebetween. As such, in some cases, it may be desirable to permit fluid transfer into, out of and/or between chamber portions 368A and 368B depending upon the desired performance characteristics of gas damper assembly 204.

For example, the arrangement shown in FIGS. 3-5 includes a substantially fluid-tight seal formed between chamber portions 368A and 368B across damper piston 326. In some cases, damper piston 326 may include a passage or port (not shown) extending through the damper piston that would permit fluid communication between chamber portions 368A and 368B through or otherwise across the damper piston. In the alternative, housing wall 366 and/or end wall 364 can include one or more passages or ports extending therethrough that will permit pressurized gas transfer into and out of chamber portion 368A and/or 368B. For example, end wall portion 372 of housing wall 366 can include one or more passage or ports 386 extending therethrough that permit pressurized gas transfer into and out of chamber portion 368A of damping chamber 368. Additionally, end wall 364 can include one or more passages or ports 388 extending therethrough that permit pressurized gas transfer into and out of chamber portion 368B of damping chamber 368. Furthermore, one or more of the passages or ports provided on or along the walls or wall portions (e.g., end wall 364, and portions 370 and/or 372 of housing wall 366) of damper element 280 can optionally include a flow control valve that restricts pressurized gas flow through the corresponding passage or port to flow in a single direction. For example, end wall portion 372 includes a passage or port 386A (FIG. 6) that extends therethrough.

A unidirectional or single direction flow control valve of a suitable type, kind and/or construction is disposed on or along the end wall portion and restricts pressurized gas flow to a single direction. In the exemplary arrangement identified in FIG. 6, a one-way valve 390 is fluidically associated with passage 386A and permits pressurized gas transfer into chamber portion 368A through passage 386A while substantially inhibiting pressurized gas transfer out of chamber portion 368A through passage 386A. As such, in the exemplary arrangement shown, pressurized gas transfer out of chamber portion 368A occurs only through the remaining one or more of passages 386.

One-way valve 390 can be supported on or along end wall 364, portions 370 and/or 372 of housing wall 366 of damper element 280 in any suitable manner. As one example, gas damper assembly 204 can include an end assembly 392 that is supported along end 360 of damper element 280 and is operatively disposed between damper elements 278 and 280. The end assembly can include one or more bearing elements, such as for providing reduced-friction or wear resistance between the damper elements, for example. The end assembly can also include one or more sealing elements, such as for reducing communication or transfer of fluid (e.g., pressurized gas) between the damper elements. The end assembly can, optionally, further include one or more bumper elements, such as may be used to inhibit or minimize contact between two or more components of the damper elements. The end assembly can, optionally, also include one or more retaining elements, such as may be suitable for supporting or otherwise retaining one or more bearing elements, one or more sealing element, one or more bumper elements and/or other components on or along the end of the damper element.

Gas spring and gas damper assembly 200 is shown in FIG. 3 supported between upper and lower structural components USC and LSC and having an assembly height, which is represented in FIG. 3 by reference dimension AH1, that corresponds to an initial height condition of the gas spring and gas damper assembly. In some cases, such an initial height condition may be referred to as a design height. At such a design height, rolling lobe 262 is disposed approximately at a design position along outer side wall portion 240 of piston 208. Additionally, at such a design height, damper piston 288 and axial clutch 292 are disposed at a design position along side wall 312 within damping chamber 3318, which, in turn, acts to position damper piston 326 at a design position along side wall portion 370 within damping chamber 368.

Figure 8:
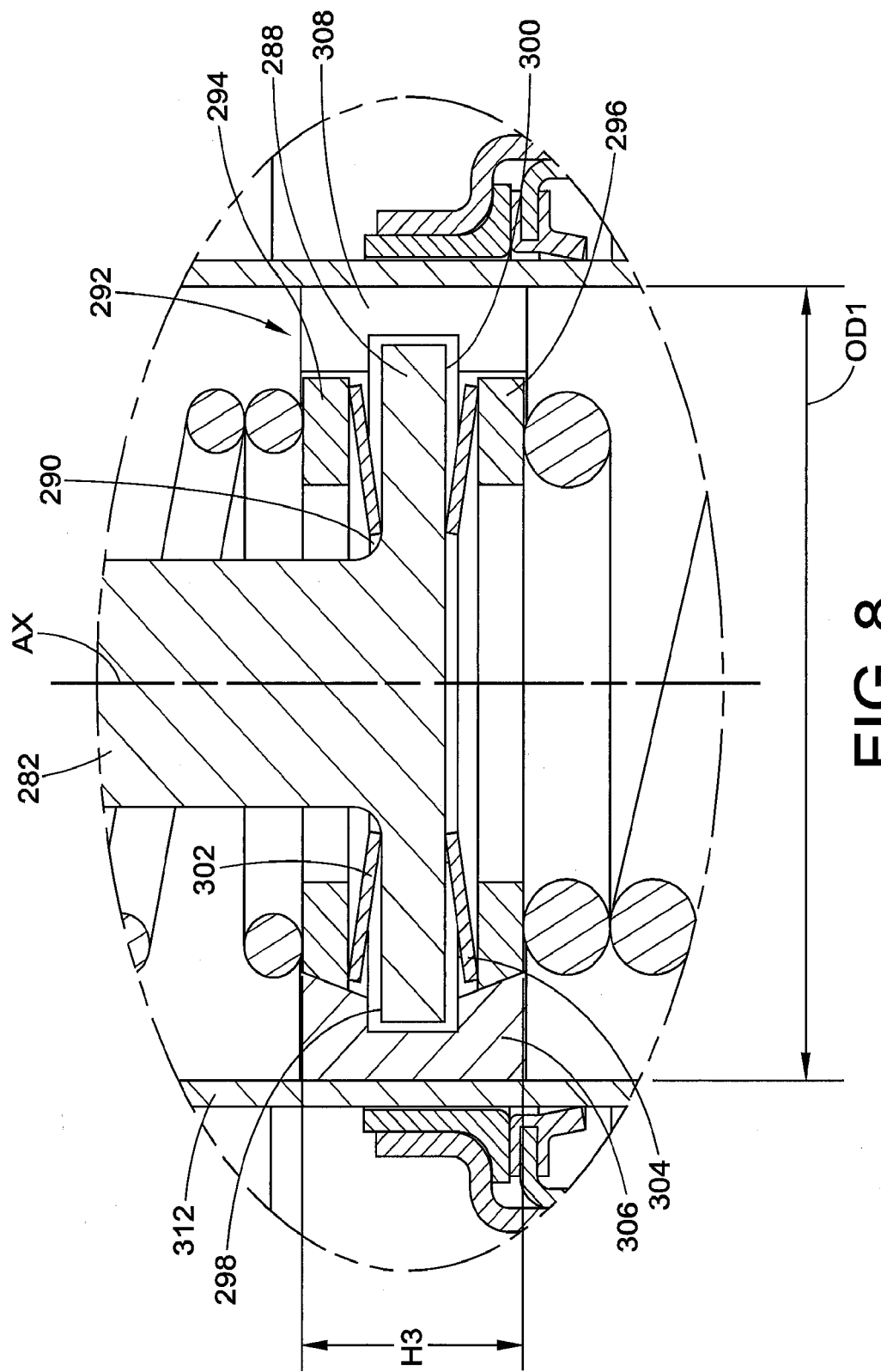
FIG. 8 is an enlarged, cross-sectional view of the portion of the gas damper assembly identified as Detail 8 in FIG. 6 and taken from along line 8-8 in FIG. 7 and illustrating an engaged condition.

As gas spring and gas damper assembly 200 is displaced into a compressed condition, which may be referred to in the art as a jounce condition, bead plate 206 and piston 208 are moved toward one another and may reach a compressed height, which is represented in FIG. 4 by reference dimension AH2, that is less than design height AH1. As bead plate 206 and piston 208 are displaced toward one another, an axial force or load is applied to damper rod 282 and damper piston 288 of damper element 276. Under load conditions having a magnitude below a predetermined force threshold, axial clutch 292 will maintain frictional engagement with side wall 312 and, thus, substantially inhibit or otherwise minimize displacement of damper elements 276 and 278 relative to one another, such as is shown in FIG. 8, for example. Under such conditions, relative movement between damper elements 278 and 280 is encouraged and increased damping performance can be achieved. Under load conditions having a magnitude at or exceeding the predetermined force threshold, axial clutch 292 releases from frictionally engaging side wall 312 such that sliding relation between the axial clutch and the side wall can occur. In some cases, a gap may be formed between an outer surface (not numbered) of axial clutch 292 and side wall 312, such as is represented by reference dimension GAP in FIGS. 9 and 10, for example. As a result, damper elements 276 and 278 can move relative to one another, such as may be beneficial for increasing the extended height or decreasing the compressed height of gas damper assembly 204, for example.

Under conditions below the predetermined force threshold, the longitudinal forces acting on damper element 276 may be insufficient to overcome the frictional engagement generated by axial clutch 292 and to further compress biasing element 358, which, due to the direction of displacement, would otherwise be compressively loaded during such displacement. As such, axial clutch 292 will remain in approximately the initial position along side wall 312 and biasing element 358 will remain in approximately the same compressive condition. As a result, the longitudinal forces acting on damper element 276 are transferred into damper element 278. In which case, damper element 278 would compress the pressurized gas contained within chamber portion 368B and urge a portion of the pressurized gas to flow out of the chamber portion through passages 388 in end wall 364 and into piston chamber 268. It will be recognized that upon sizing and configuring passages 388 such that an appropriate total orifice area (e.g., total cross-sectional area for the active passages) for a given application is provided, such a flow of pressurized gas through passages 388 can operate to dissipate a portion of the energy acting on assembly 200 and thereby provide a damping action thereto.

As damper element 278 is displaced toward end wall 364, damper piston 326 will contact bumper 378. As discuss above, bumper 378 may also operate as a biasing element that includes a spring rate and that will deflect upon the application of a sufficiently-high longitudinal force thereto. Upon contacting bumper 378 with such a sufficiently-high force, damper piston 326 of damper element 278 will continue to urge pressurized gas through passages 388 and will also compress bumper 378, such as is shown in FIG. 4, for example. In some cases, bumper 378 may be compressed or otherwise deformed by an amount sufficient to fluidically isolate passages 388 from chamber portion 368B and thereby prevent further flow of pressurized gas through passages 388. In other cases, however, bumper 378 may be configured such that passages 388 remain in fluid communication with chamber portion 368B even at the maximum deformation of bumper 378.

Additionally, upon contacting bumper 378 or at some point earlier thereto or occurring thereafter, the longitudinal force acting on damper element 276 may equal or exceed the predetermined force threshold of axial clutch 292. In such case, axial clutch 292 will deactuate and transition into a condition under which sliding relation with side wall 312 occurs. Under such conditions, biasing element 358 can be compressed, such as is shown in FIG. 4, for example, thereby permitting damper piston 288 and axial clutch 292 to translate along side wall 312 in a direction toward damper piston 326.

During assembly of damper element 278, it may be desirable to preload biasing elements 356 and 358, such as has been described above. As such, biasing element 356 may expand slightly upon translation of damper piston 288 and axial clutch 292 toward damper piston wall 326. Depending upon the magnitude of the translation of damper piston 288 and axial clutch 292 toward damper piston wall 326, biasing element 356 may, in some cases, separate from end cap 330. While it will be appreciated that the preload level of biasing elements 356 and 358 may vary from application to application, one exemplary range for the preload level can be from approximately 2% to approximately 40% of the design load of the gas spring assembly.

Furthermore, it will be recognized that as assembly 200 is compressed, the gas pressure within spring chamber 212 and piston chamber 268 increases, at least temporarily. It has been recognized that gas damping has a relationship to the magnitude of the difference between the pressure of the gas within the damping chamber (e.g., chamber portion 368B) and the pressure of the gas into which the gas from the damping chamber flows (e.g., piston chamber 268). Thus, increasing the pressure within the damping chamber (e.g., chamber portion 328B) and/or decreasing the pressure of the surrounding gas into which the gas from the damping chamber flows (e.g., piston chamber 268) can result in improved damping performance.

In addition to acting as a biasing element and preventing direct contact between damper piston 326 and end wall 364, bumper 378 may also improve the damping performance of damper 204 during compression by taking up volume within chamber portion 368B and thereby causing the gas pressure within the chamber portion to increase at a faster rate. In a preferred arrangement, gas damper assembly 204 will operate to build gas pressure within chamber portion 368B at the same or a faster rate than the rate at which the pressure is increasing within the spring and piston chambers due to compression of assembly 200. In such case, the same or a greater differential pressure can be achieved, which is expected to result in improved gas damping performance.

As described above, end wall portion 372 of housing wall 366 includes one or more passages 386 extending therethrough in fluid communication with chamber portion 368A of damping chamber 368. As damper piston 326 of damper element 278 is displaced toward end wall 364 of damper element 280, the volume of chamber portion 368A increases, which may initially result in a reduced pressure level within the chamber portion. As discussed above, however, the pressure level within spring chamber 212 and piston chamber 268 is increasing at this same time. As such, a portion of the pressurized gas within the spring and piston chambers will flow through passages 386 and into chamber portion 368A, upon sizing and configuring passages 386 such that an appropriate total orifice area (e.g., total cross-sectional area for the active passages) for a given application is used. Additionally, one or more of passages 386, such as passage 386A, for example, can be operatively associated with a one-way flow control device, such as valve 390, for example, that will permit additional pressurized gas transfer into chamber portion 368A while permitting an appropriate total orifice area to be used for damping purposed during displacement of the assembly in the opposing direction (i.e., during extension).

One benefit of permitting pressurized gas from the spring and piston chambers to flow into chamber portion 368A is that an overall reduction in the pressure within spring chamber 212 and piston chamber 268 can be achieved. And, as discussed above, improved damping performance can result from increasing the differential pressure between the gas within the damping chamber (e.g., chamber portion 368B) and the pressure of the gas into which the gas from the damping chamber flows (e.g., piston chamber 268). Another benefit of permitting pressurized gas from the spring and piston chambers to flow into chamber portion 368A is that the gas pressure within chamber portion 368A is at least temporarily increased. As will be discussed in greater detail hereinafter, such an increased pressure level can provide a further increased pressure differential between the gas within chamber portion 368A and the gas into which the gas from chamber portion 368A will flow during extension.

As gas spring and gas damper assembly 200 is displaced into an extended condition, which may be referred to in the art as a rebound condition, bead plate 206 and piston 208 are moved away one another and may reach an extended height, which is represented in FIG. 6 by reference dimension AH3, that is greater than design height AH1. As bead plate 206 and piston 208 are displaced away from one another, damper rod 282 and damper piston 288 of damper element 276 are also displaced away from piston 208.

Initially, the longitudinal forces acting on damper element 276 may be insufficient to overcome the frictional engagement generated by axial clutch 292 and to further compress biasing element 356, which, due to the direction of displacement, would otherwise be compressively loaded during such displacement. As such, axial clutch 292 will remain in approximately the initial position along side wall 312 and biasing element 356 will remain in approximately the same compressive condition. As a result, the longitudinal forces acting on damper element 276 are transferred into damper element 278. In which case, damper element 278 would compress the pressurized gas contained within chamber portion 368A and urge a portion of the pressurized gas to flow out of the chamber portion through passages 386 in end wall portion 372 (other than passage 386A, which may be fluidically isolated under such conditions by one-way valve 390) and into spring chamber 212. It will be recognized that upon sizing and configuring passages 386 such that an appropriate total orifice area (e.g., total cross-sectional area for the active passages) for a given application is provided, such a flow of pressurized gas through passages 386 can operate to dissipate a portion of the energy acting on assembly 200 and thereby provide a damping action thereto.

It will be appreciated that pressurized gas within chamber portion 368A is capable of flowing through passages at a given rate depending upon various factors, such as the total orifice area of passages 386, for example. As such, continued extension of assembly 200 can compress the gas within chamber portion 368A and thereby increase the pressure level thereof. This increased pressure level and/or contact with a bumper, such as bumper 392 (FIG. 6), for example, may, at some point, generate a sufficiently-high longitudinal force acting on damper element 276 to equal or exceed a predetermined force threshold of axial clutch 292. In such case, axial clutch 292 will deactuate and transition into a condition under which sliding engagement with side wall 312 occurs. Under such conditions, biasing element 356 can be compressed, such as is shown in FIG. 5, for example, thereby permitting damper piston 288 and axial clutch 292 to translate along side wall 312 in a direction toward end cap 330.

Additionally, it will be recognized that as assembly 200 is extended, the gas pressure within spring chamber 212 and piston chamber 268 decreases, at least temporarily. At that same time, the gas pressure within chamber portion 368A is increasing, such as has been described above, for example. As a result, an increased differential pressure between the gas within the damping chamber (e.g., chamber portion 368A) and the pressure of the gas into which the gas from the damping chamber flows (e.g., spring chamber 212) may be achieved, which may provide increased damping performance. Additionally, as described above, valve 390 can act as a charging valve that permits an increased volume of pressurized gas to transfer into chamber portion 368A during compression, which can result in an increased overall pressure level within the chamber portion. Upon transitioning to extension, this increased overall pressure level represents the initial pressure level of the pressurized gas within chamber portion 368A as the chamber portion begins to undergo compression, as described above.

Gas spring and gas damper assembly can optionally include any number of one or more additional elements, features and/or components. For example, a distance sensing device can be operatively connected on or along one of the components of the gas spring assembly or the gas damper assembly. As shown in FIGS. 3-6, for example, a height sensor 394 can be operatively secured on or along end wall portion 372 of housing wall 366 and can transmit suitable electromagnetic or ultrasonic waves WVS in an approximately longitudinal direction toward bead plate 206. It will be appreciated, however, that other arrangements could alternately be used.

It will be recognized that the foregoing discussion of FIGS. 3-6 regarding the displacement of gas spring and gas damper assembly 200 from a design height to a compressed height and an extended height included movement in a substantially longitudinal direction. In many applications, such as vehicle applications, for example, conventional gas spring assemblies are often displaced such that the first or upper end member (e.g., bead plate 206) and the second or lower end member (e.g., piston 208) are disposed at an angle relative to one another. In some cases, the angle may change (e.g., increase or decrease) as the end members are displaced toward and away from one another. It will be appreciated that conventional gas spring assemblies can typically accommodate such angular misalignments. In some cases, however, the gas spring assembly will include an internally mounted device, such as a rebound limiter or a gas damper assembly, for example, that can limit the amount of angular misalignment that can be accommodated.

In such cases, however, it will often be desirable for a gas spring assembly (e.g., gas spring assembly 202) having an internally mounted device (e.g., gas damper assembly 204) to be capable of operation in applications and operating conditions that can result in relatively high misalignment conditions without interfering with the operation and/or seal integrity of internally mounted device (e.g., gas damper assembly 204). As such, gas spring and gas damper assembly 200 is shown in FIGS. 2-5 as including a high-articulation misalignment mount 396 and a low-profile misalignment mount 398. Misalignment mount 396 operatively connects end 274 of gas damper assembly 204 with piston 208, and is capable of freely compliant (e.g., non-resilient) articulation. Additionally, end 272 of gas damper assembly 204 is shown as being operatively connected with bead plate 206 by way of low-profile misalignment mount 396. It will be appreciated, however, that mounts 396 and 398 are optional and that either one or both of mounts 396 and 398 can be included on or used in connection with gas spring and gas damper assembly 200.

Figure 10:
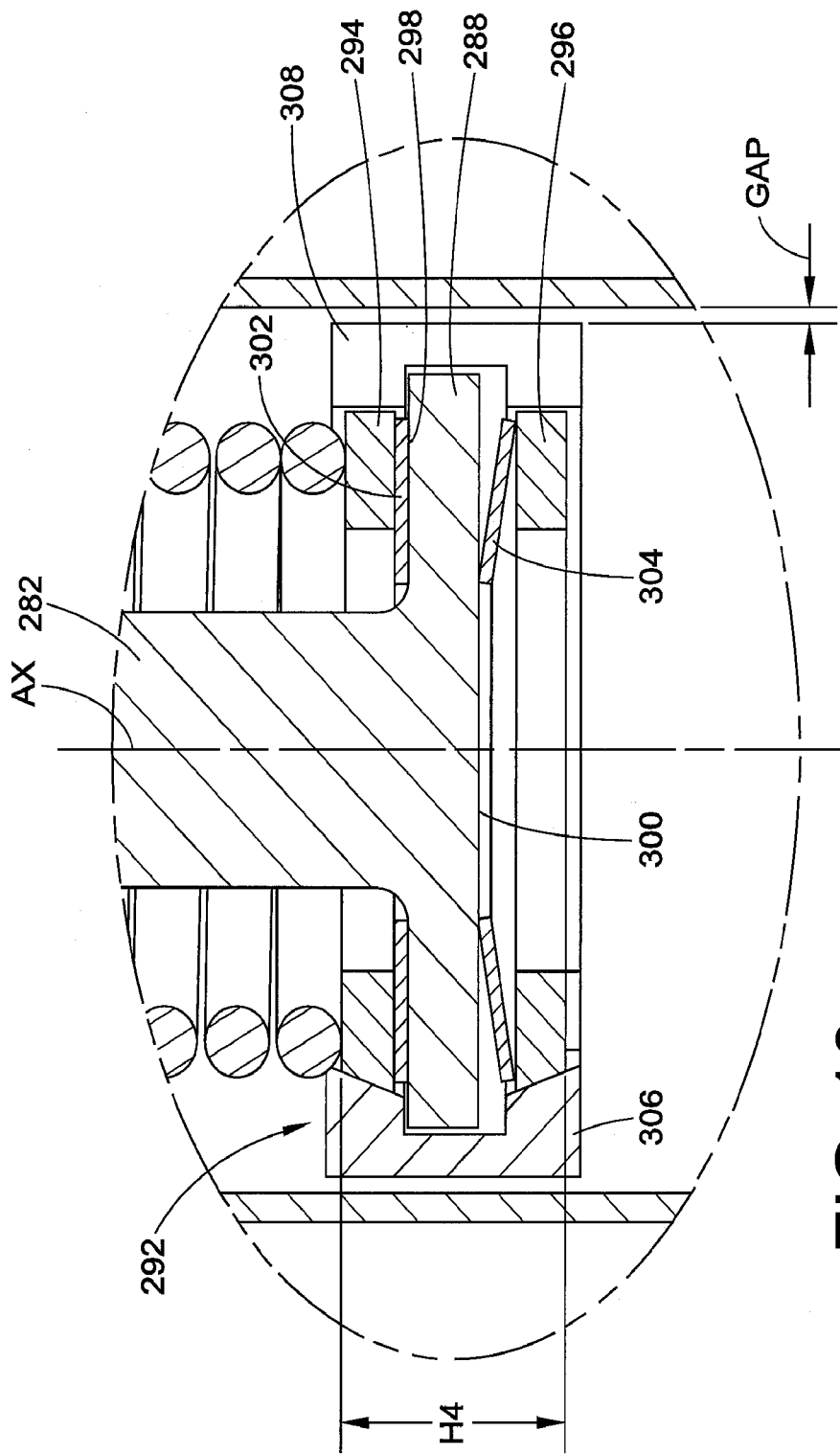
FIG. 10 is an enlarged, cross-sectional view of the portion of the gas damper assembly identified as Detail 10 in FIG. 5 and illustrating a disengaged condition.
Figure 11:
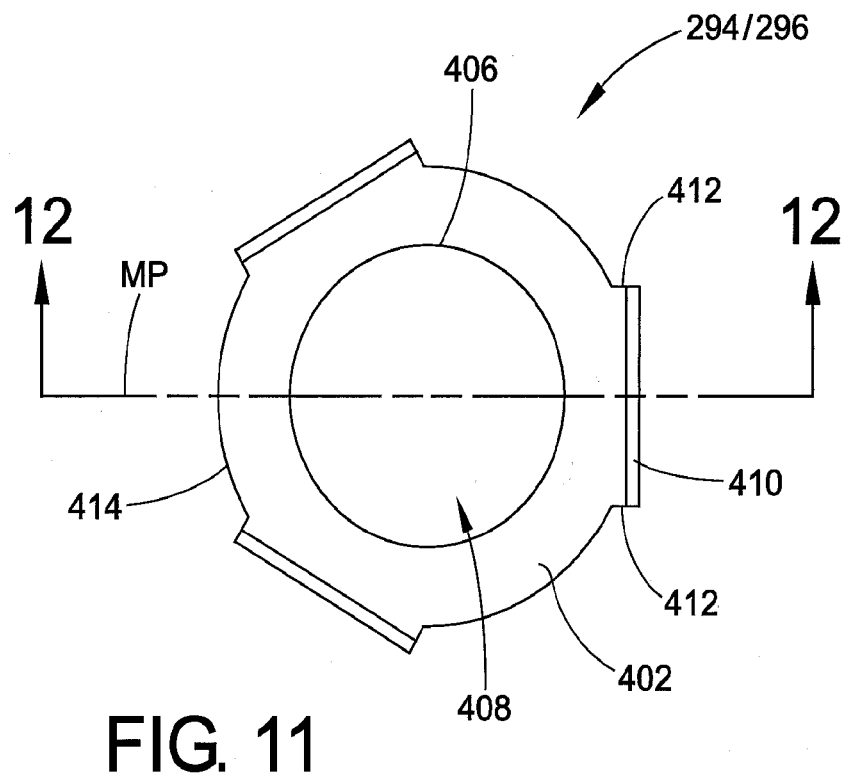
FIG. 11 is a top plan view of one example of a cam member for an axial clutch in accordance with the subject matter of the present disclosure, such as is shown in the gas damper assembly of FIGS. 3-10.
Figure 12:
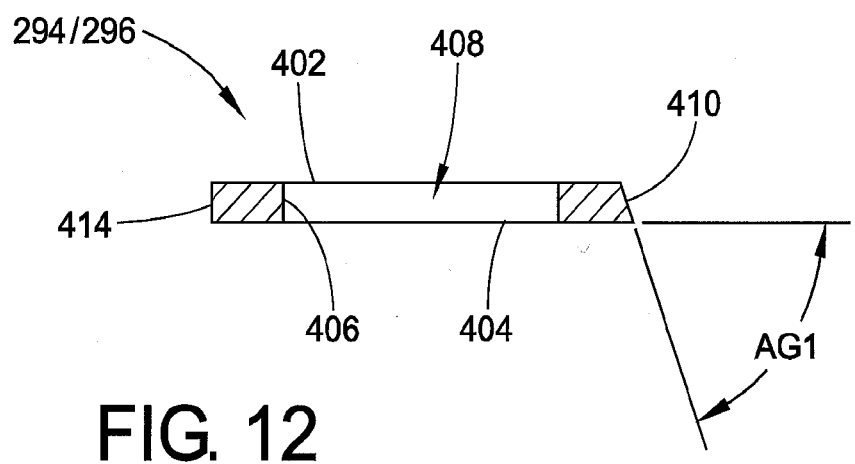
FIG. 12 is a cross-sectional side view of the cam member in FIGS. 3-11 taken from along line 12-12 in FIG. 11.

FIGS. 11 and 12 illustrate one example of a cam member, such as cam members 294 and 296, for example, that includes opposing sides 402 and 404 that are spaced a distance apart from one another such that the cam members have a thickness. An inner wall 406 at least partially defines an opening 408 extending through the cam members. A plurality of cam surfaces 410 are spaced apart from one another about the periphery of the cam members. The one or more cam surfaces are oriented transverse to a midplane MP extending through a central axis AX (FIGS. 8-10) of the cam member and include end walls 412 that extend in offset alignment with the midplane corresponding to each cam surface. It will be appreciated that a plurality of midplanes could be defined about axis AX with each corresponding to an individual cam surface. An outer wall 414 extends between adjacent cam surfaces. The cam surfaces are disposed at a non-zero and non-perpendicular angle relative to sides 402 and 404, such as is represented in FIG. 12 by angular dimension AG1. It will be appreciated that an angle within any suitable range of angles can be used. As one example, angle AG1 can be within a range of from approximately 5 degrees to approximately 85 degrees.

Figure 13:
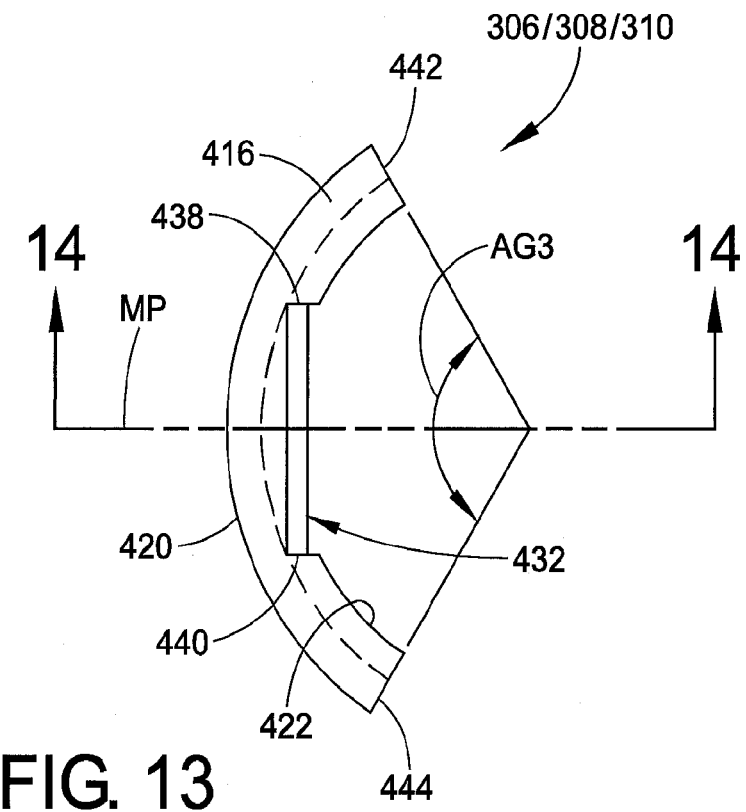
FIG. 13 is a top plan view of one example of a friction element for an axial clutch in accordance with the subject matter of the present disclosure, such as is shown in the gas damper assembly of FIGS. 3-10.
Figure 14:
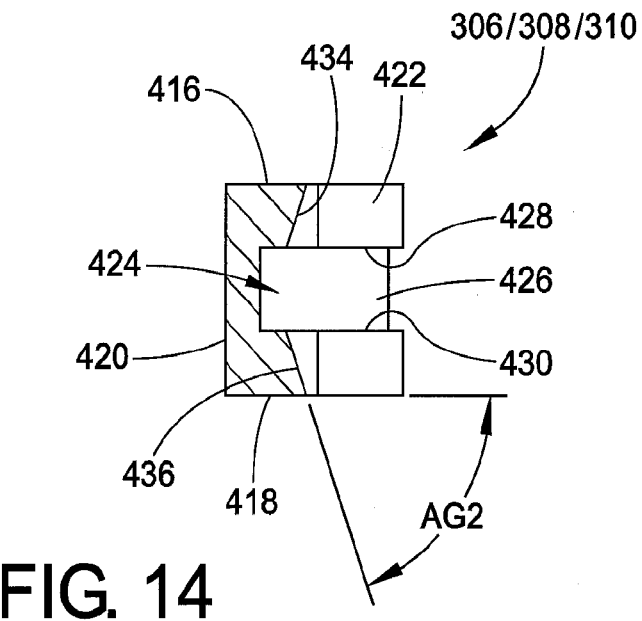
FIG. 14 is a cross-sectional side view of the friction element in FIGS. 3-10 and 13 taken from along line 14-14 in FIG. 13.

FIGS. 13 and 14 illustrate one example of a friction element or shoe, such as friction elements 306-310, for example, that includes opposing sides 416 and 418 that are spaced a distance apart from one another to define a thickness or height of the friction elements. An outer wall or surface 420 extends heightwise between sides 416 and 418, and is dimensioned to cooperatively engage an inner surface of a side wall of a corresponding damper element (e.g., an inner surface of side wall 312 of damper element 278). As one example, outer wall 420 can be substantially semi-cylindrical in shape. The friction elements also include an inner wall 422 and a channel 424 that is open along inner wall 422 and is at least partially defined by a bottom wall 426 and opposing side walls 428 and 430. As illustrated in FIGS. 6 and 8-10, channel 424 is preferably dimensioned to receive damper piston 288 and provide clearance along both sides 298 and 300 thereof such that the friction elements can be displaced both axially and radially relative to the damper piston, such as is shown in FIGS. 8-10, for example.

The friction elements also include a cam recess 432 that is at least partially defined by opposing cam surfaces 434 and 436 that are disposed at an angle relative to one another and relative to sides 416 and 418, such as is represented in FIG. 14 by angular dimension AG2. It will be appreciated that cam surfaces 434 and 436 can be disposed a different angles relative to the sides. However, in a preferred arrangement, cam surfaces 434 and 436 are disposed at a common angle relative to sides 416 and 418 and at an angle that is cooperative with one or more of cam surfaces 410 of corresponding cam members 294 and/or 296. Additionally, the cam surface can be oriented transverse to a midplane MP extending through a central axis AX (FIGS. 8-10) of the friction element, and can include end walls 438 and 440 that extend in offset alignment with the midplane. Additionally, where a plurality of friction elements are used, the friction elements can extend peripherally between opposing end walls 442 and 444. In some cases, the end wall can be disposed at an angle relative to one another, such as is represented by angular dimension AG3. As one example, such an angle can be determined by dividing 360 degrees by the number of friction elements that are to be used. Additionally, clearance between the adjacent friction elements can be provided to permit the friction elements to undergo displacement between radially-inward and radially-outward positions.

As shown in FIG. 8, cam members 294 and 296 of axial clutch 292 are spaced a first distance apart in the frictionally-engaged condition, such as is represented by dimension H3. Distance H3 is controlled by biasing elements 302 and 304 urging cam members 294 and 296 into axially-outward positions. In turn, cam surfaces 410 of the cam members abuttingly engage cam surfaces 434 or 436 of friction elements 306-310. Due to the angle of the mating cam surfaces, the friction elements are forced radially-outwardly and into abutting engagement with the side wall of the associated damper element. In this way, axial clutch can frictionally-engage the side wall and maintain the relative position of one damping element relative to another.

As the forces applied to the damper elements increase, one of biasing elements 302 and 304 can be deflected into a collapsed condition, such as is shown in FIGS. 9 and 10, for example. In such case, cam members 294 and 296 are spaced a second distance apart from one another, such as is represented by dimension H4 in FIG. 10, for example. The second distance is less than the first distance such that friction elements 306-310 are urged radially-outwardly by a reduced distance. As such, the frictional force generated by the friction elements is reduced and the damper elements are permitted to move relative to one another. In some cases, a gap GAP (FIG. 10) may be formed between one or more of the friction elements and the inner surface of the side wall. However, it will be understood that the size of features and components in the drawing figures have been exaggerated for purposes of clarity and easy of understanding.

Figure 15:
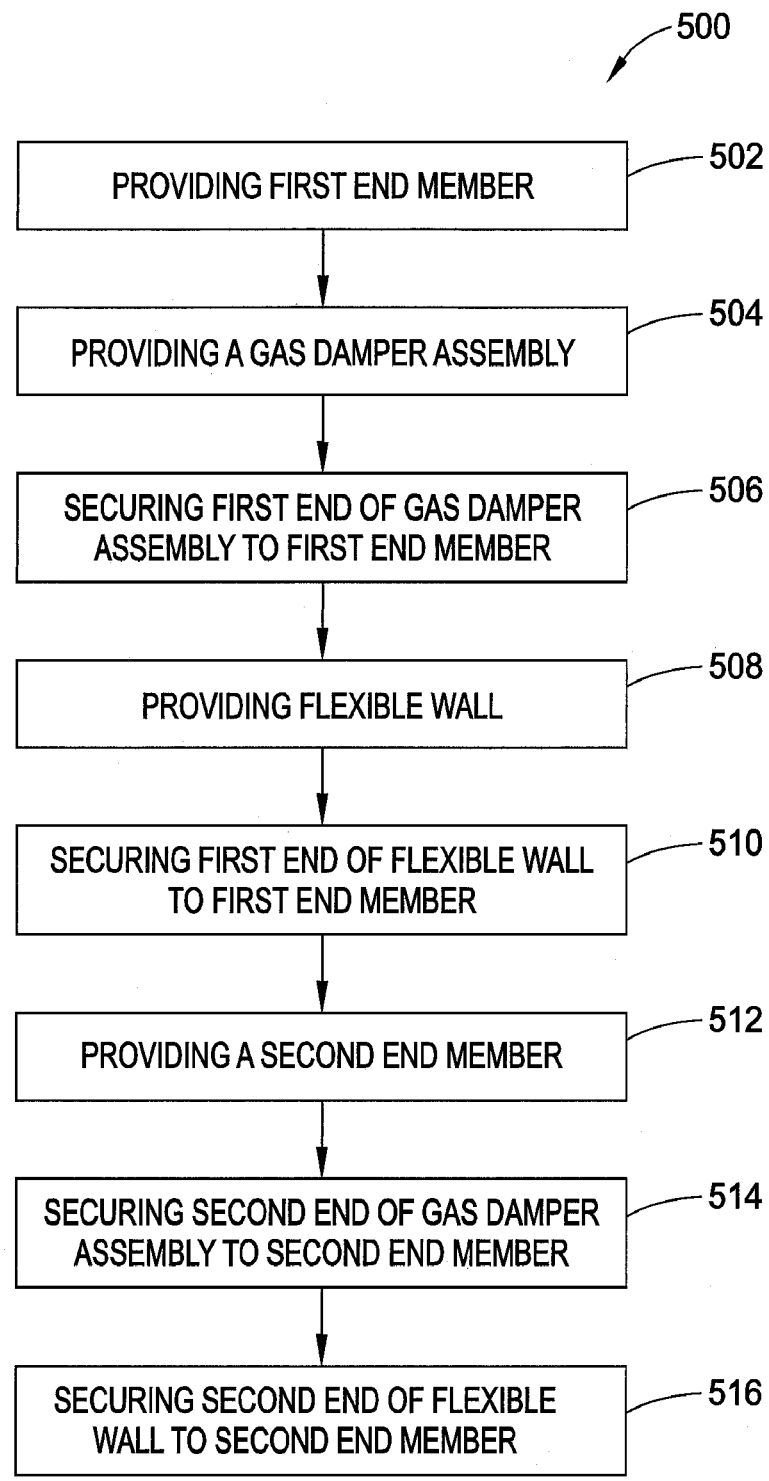
FIG. 15 is a graphical representation of one example of a method of assembling a gas spring and gas damper assembly in accordance with the subject matter of the present disclosure.

One example of a method of assembling a gas spring and gas damper assembly in accordance with the subject matter of the present disclosure, such as gas spring and gas damper assemblies 200, for example, is illustrated in FIG. 15 as method 500. The method can include providing a first end member of the gas spring assembly (e.g., bead plate 206 of gas spring assembly 202), as is represented in FIG. 15 by item number 502. Method 500 can also include providing a gas damper assembly having an axial clutch (e.g., gas damper assembly 204 which includes axial clutch 292), as is represented in FIG. 15 by item number 504. The method can further include securing a first end (e.g., end 272) of the gas damper assembly on or along the first end member, as is represented by item number 506. Method 500 can further include providing a flexible wall (e.g., flexible wall 210), as is represented by item number 508, and securing a first end (e.g., end 214) of the flexible wall on or along the first end member, as is represented in FIG. 15 by item 510. Method 500 can also include providing a second end member (e.g., piston 208), as is represented by item number 512, and securing a second end (e.g., end 274) of the gas damper assembly on or along the second end member, as is represented in FIG. 15 by item number 514. Method 500 can further include securing a second end (e.g., end 216) of the flexible wall on or along the second end member, as is represented in FIG. 15 by item number 516.

Figure 16:
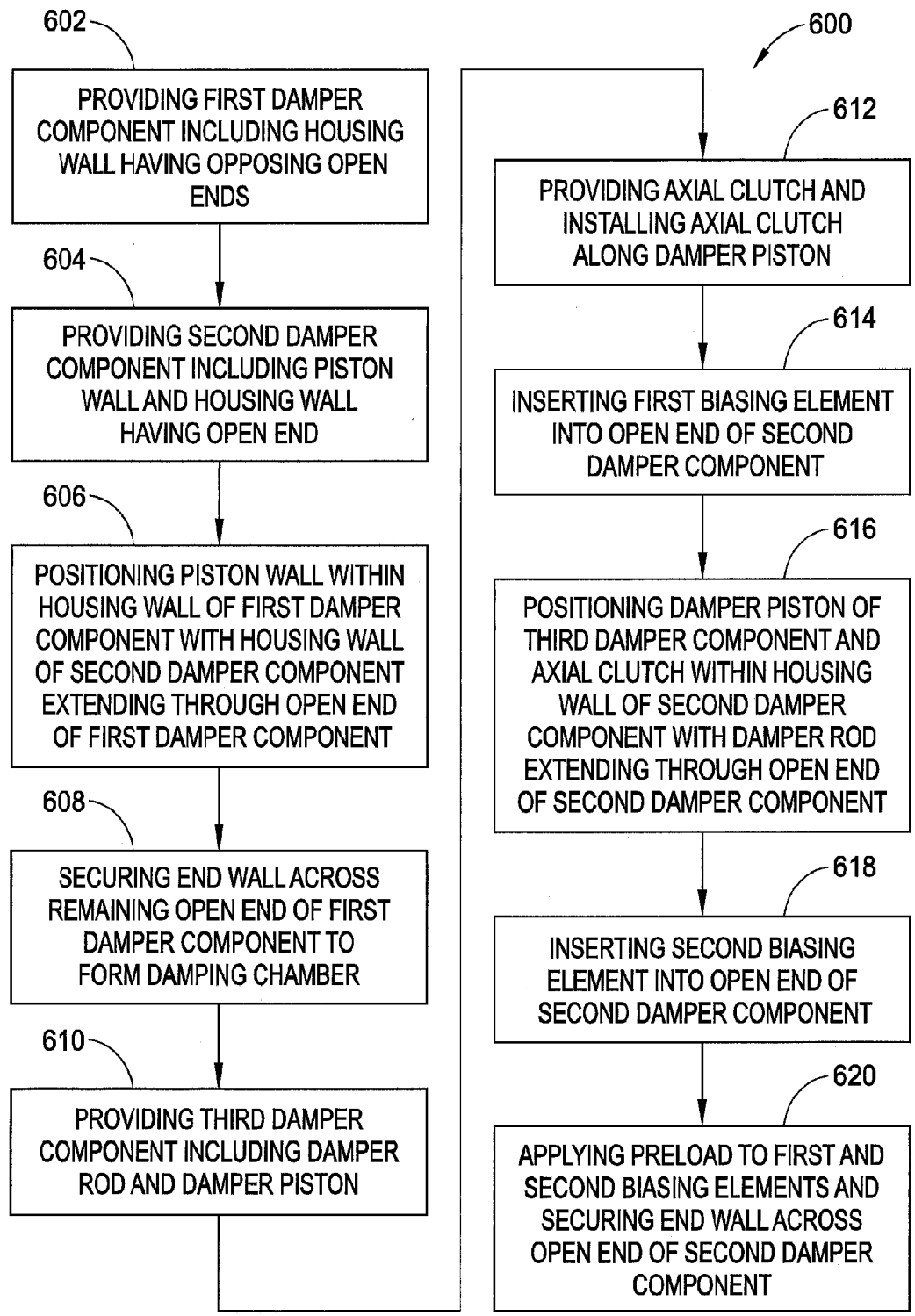
FIG. 16 is a graphical representation of one example of a method of assembling a gas damper assembly in accordance with the subject matter of the present disclosure.

One example of a method of assembling a gas damper assembly having an axial clutch in accordance with the subject matter of the present disclosure, such as gas damper assembly 204, for example, is illustrated in FIG. 16 as method 600. The method can include providing a first damper component including a housing wall (e.g., housing wall 366) having opposing open ends (e.g., the damper passage at least partially defined by passage wall 374 and the open end formed by side wall portion 370 along end 362), as is represented in FIG. 16 by item number 602. Method 600 also includes providing a second damper component including a housing wall (e.g., side wall 312) having an open end (e.g., the open end formed by side wall 312 along end 314) and a damper piston (e.g., damper piston 326), as is represented by item number 604. Method 600 can further include positioning the damper piston within the housing wall (e.g., housing wall 366) of the first damper component with the housing wall (e.g., side wall 312) of the second damper component extending through an open end (e.g., the damper passage at least partially defined by passage wall 374) of the first damper component, as is represented in FIG. 16 by item number 606. Method 600 can also include securing an end wall (e.g., end wall 364) across the remaining open end (e.g., the open end formed by side wall portion 370 along end 362) to form a damping chamber (e.g., damping chamber 368), as is represented by item number 608.

Method 600 can also include providing a third damper component including a damper rod (e.g., damper rod 282) and a damper piston (e.g., damper piston 288, as is represented in FIG. 16 by item number 610. Method 600 can further include providing an axial clutch (e.g., axial clutch 292) and installing the axial clutch on or along the damper piston (e.g., damper piston 288), as is represented in FIG. 16 by item number 612. Method 600 can also include providing a first biasing element (e.g., biasing element 358) and inserting the first biasing element into a damping chamber (e.g., damping chamber 318) of the second damper component, as is represented by item number 614. Method 600 can further include positioning the damper piston (e.g., damper piston 288) and axial clutch (e.g., axial clutch 292) within the damping chamber (e.g., damping chamber 318) defined by the housing wall (e.g., side wall 312) with the damping rod (e.g., damping rod 282) projecting outwardly from the open end (e.g., the open end formed by side wall 312 along end 314) of the housing wall, as is represented by item number 616. The method can, optionally, include deactuating or otherwise decreasing the size of the axial clutch prior to positioning the damper piston and axial clutch within the damping chamber. Method 600 can further include providing a second biasing element (e.g., biasing element 356) and inserting the second biasing element into the damping chamber of the second damper component, as is represented in FIG. 16 by item number 618. Method 600 can also include applying a preload to the first and/or second biasing elements (e.g., biasing elements 358 and 356) and securing an end wall (e.g., end cap 330) across the open end of the housing wall of the second damper component, as is represented in FIG. 16 by item number 620.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A gas spring and gas damper assembly comprising:
a gas spring assembly having a longitudinal axis and including:
a first end member;
a second end member spaced longitudinally from said first end member; and,
a flexible wall extending circumferentially about said longitudinal axis and being operatively connected between said first and second end members such that a spring chamber is at least partially defined therebetween; and,
a gas damper assembly disposed within said spring chamber and operatively connected between said first and second end members, said gas damper assembly including:
a first damper element operatively connected to said first end member and including a first side wall and a first end wall that at least partially define a first damping chamber;
a second damper element extending longitudinally between a first end and a second end opposite said first end, said second damper element including a second end wall and a second side wall at least partially defining a second damping chamber with at least one of said first and second damping chambers disposed in fluid communication with said spring chamber, said second end wall disposed transverse to said second side wall and at least partially forming a second element piston, said second damper element being oriented such that said second element piston and at least a portion of said second side wall are disposed within said first damping chamber, said second damper element being slidably supported within said first damping chamber such that said second end wall is displaceable relative to said first side wall of said first damper element;
a third damper element operatively connected to said second end member and including a damper rod and an element piston assembly disposed along said damper rod in spaced relation to said second end member, said third damper element being oriented such that said element piston assembly and at least a portion of said damper rod are disposed within said second damping chamber, said element piston assembly including an axial clutch that includes at least one piston element disposed along said second side wall of said second damping element;
said gas spring and gas damper assembly operable in a first condition in which said at least one piston element of said axial clutch is substantially fixedly engaged with said second side wall of said second damper element such that relative axial movement between said second and third damper elements is substantially inhibited under operating conditions having less than a predetermined differential force threshold between said second and third damper elements thereby generating pressurized gas damping in said first damping chamber due to relative displacement between said first and second damper elements; and,
said gas spring and gas damper assembly operable in a second condition in which said at least one piston element of said axial clutch is slidingly engaged with said second side wall of said second damper element such that said second and third damper elements are displaceable relative to one another under operating conditions having equal to or greater than said predetermined differential force threshold between said second and third damper elements.

2. A gas spring and gas damper assembly according to claim 1, wherein said damper rod extends lengthwise between a first end disposed toward said second end member and a second end disposed in distal relation to said second end member relative to said first end, and said third damper element includes a damper piston wall extending radially-outwardly along said second end of said damper rod, said damper piston wall including opposing first and second sides with at least a portion of said at least one piston element disposed along each of said first and second sides of said damper piston wall.

3. A gas spring and gas damper assembly according to claim 2, wherein said at least one piston element includes a plurality of piston elements disposed peripherally about said damper piston wall.

4. A gas spring and gas damper assembly according to claim 2, wherein said at least one piston element is includes an outer surface extending axially therealong and a channel extending at least partially along said at least one piston element in radially inwardly-spaced relation to said outer surface, said channel being at least partially defined by a bottom surface and first and second side surfaces that extend radially inwardly from along said bottom surface, said first and second side surfaces disposed in spaced relation to one another such that said damper piston wall can be at least partially received within said channel.

5. A gas spring and gas damper assembly according to claim 4, wherein said at least one piston element includes an inner surface extending axially therealong with said channel extending into said at least one piston element from along said inner surface such that first and second wall portions of said at least one piston element are formed along axially-opposing sides of said channel, said at least one piston element including at least one cam recess extending into at least one of said first and second wall portions from along said inner surface.

6. A gas spring and gas damper assembly according to claim 5, wherein said at least one cam recess includes a first cam recess extending into said first wall portion and a second cam recess extending into said second wall portion.

7. A gas spring and gas damper assembly according to claim 6, wherein said first cam recess includes a first cam surface disposed at a first angle relative to said first side surface, and said second cam recess includes a second cam surface disposed at a second angle relative to said second side surface, said first and second angles having a value within a range of from approximately 5 degrees to approximately 85 degrees.

8. A gas spring and gas damper assembly according to claim 7, wherein said first and second angles are approximately equal to one another.

9. A gas spring and gas damper assembly according to claim 2, wherein said axial clutch includes at least one cam member operatively engaging said at least one piston element.

10. A gas spring and gas damper assembly according to claim 9, wherein said at least one cam member includes a first cam member disposed along said first side of said damper piston wall and a second cam member disposed along said second side of said damper piston wall, said first and second cam members operatively engaging said at least one piston element and being axially displaceable relative to said damper piston wall such that said axial clutch can be variable between said engaged condition and said disengaged condition.

11. A gas spring and gas damper assembly according to claim 10, wherein said first cam member includes first and second side surfaces and a first cam member surface disposed at a first angle relative to said first side surface of said first cam member, and said second cam member includes first and second side surfaces and a second cam member surface disposed at a second angle relative to said first side surface of said second cam member, said first and second angles having a value within a range of from approximately 5 degrees to approximately 85 degrees.

12. A gas spring and gas damper assembly according to claim 11, wherein said first and second angles respectively of said first and second cam members are approximately equal to one another, and approximately equal to said first and second angles respectively of said first and second cam surfaces of said at least one piston element.

13. A gas spring and gas damper assembly according to claim 9, wherein said axial clutch includes at least one biasing element operatively disposed between said at least one cam member and said damper piston wall.

14. A gas spring and gas damper assembly comprising:
  a gas spring assembly having a longitudinal axis and including:
    a first end member;
    a second end member spaced longitudinally from said first end member; and,
    a flexible wall extending circumferentially about said longitudinal axis and being operatively connected between said first and second end members such that a spring chamber is at least partially defined therebetween; and,
  a gas damper assembly disposed within said spring chamber and operatively connected between said first and second end members, said gas damper assembly including:
    a first damper element operatively connected to said first end member and including a first side wall and a first end wall that at least partially define a first damping chamber;
    a second damper element extending longitudinally between a first end and a second end opposite said first end, said second damper element including a second end wall and a second side wall at least partially defining a second damping chamber, said second end wall disposed transverse to said second side wall and at least partially forming a second element piston, said second damper element being oriented such that said second element piston and at least a portion of said second side wall are disposed within said first damping chamber, said second damper element being slidably supported within said first damping chamber such that said second end wall is displaceable relative to said first side wall of said first damper element;
    a third damper element operatively connected to said second end member, said third damper element including a damper rod and an element piston assembly, said third damper element being oriented such that said element piston assembly and at least a portion of said damper rod are disposed within said second damping chamber, said damper rod extending between a first end disposed toward said second end member and a second end disposed in spaced relation to said second end member, said element piston assembly including a damper piston wall and an axial clutch assembly, said damper piston wall extending radially-outward along said second end of said damper rod and including opposing first and second sides, said axial clutch assembly being variable between an engaged condition in which said axial clutch assembly substantially inhibits movement of said third damper element relative to said second damper element under operating conditions having less than a predetermined differential force threshold therebetween and a disengaged condition in which said second and third damper elements are displaceable relative to one another under operating conditions having equal to or greater than said predetermined differential force threshold, said axial clutch assembly including:
      at least one piston element disposed along said second side wall of said second damping element;
      at least one cam member operatively engaging said at least one piston element, said at least one cam member including a first cam member disposed along said first side of said damper piston wall and a second cam member disposed along a second side of said damper piston wall; and,
      at least one biasing element operatively disposed between said at least one cam member and said damper piston wall, said at least one biasing element including a clutch first biasing element disposed in abutting engagement between said first side of said damper piston wall and said first cam member and a second clutch biasing element disposed in abutting engagement between said second side of said damper piston wall and said second cam member such that said first and second cam members are biased axially outwardly into abutting engagement with said at least one piston element such that said at least one piston element is biased into frictional engagement with said second side wall in said engaged condition of said axial clutch assembly and said at least one piston element being released into sliding relation with said second side wall in said disengaged condition of said axial clutch assembly.

15. A gas spring and gas damper assembly according to claim 14 further comprising first and second damper biasing elements, said first damper biasing element disposed between a first side of said element piston assembly and said first end of said second damper element, said second damper biasing element disposed between a second side of said element piston assembly and said second end of said second damper element.

16. A gas spring and gas damper assembly according to claim 15, wherein said first damper biasing element has a first spring rate, and second damper biasing element has a second spring rate that is different from said first spring rate.

17. A method of assembling a gas spring and gas damper assembly, said method comprising:
  providing a first damper element including a first end wall and a first side wall at least partially defining a first damping chamber;

providing a second damper element extending longitudinally between a first end and a second end opposite said first end, said second damper element including a second end wall and a second side wall at least partially defining a second damping chamber, said second end wall disposed transverse to said second side wall and at least partially forming a second element piston;

positioning said second element piston and at least a portion of said second side wall within said first damping chamber such that said second damper element is slidably supported within said first damping chamber and said second element piston is displaceable relative to said first side wall of said first damper element;

providing a third damper element including a damper rod and an element piston assembly disposed along said damper rod, said damper rod extending between a first end and a second end disposed in spaced relation to said first end, said element piston assembly including a damper piston wall and an axial clutch assembly, said damper piston wall extending radially outward along said second end of said damper rod and including opposing first and second sides, said axial clutch assembly including:

at least one piston element;

at least one cam member operatively engaging said at least one piston element, said at least one cam member including a first cam member disposed along said first side of said damper piston wall and a second cam member disposed along a second side of said damper piston wall; and, a clutch first biasing element disposed in abutting engagement between said first side of said damper piston wall and said first cam member and a clutch second biasing element disposed in abutting engagement between said second side of said damper piston wall and said second cam member;

said axial clutch assembly variable between an engaged condition in which said axial clutch assembly is operative to substantially inhibit movement of said third damper element relative to said second damper element under operating conditions having less than a predetermined differential force threshold therebetween and a disengaged condition in which said second and third damper elements are displaceable relative to one another under operating conditions having equal to or greater than said predetermined differential force threshold;

placing said axial clutch assembly of said third damper element into said disengaged condition;

positioning said third damper element at least partially within said second damping chamber of said second damper element such that said damper piston wall, said axial clutch assembly and at least a portion of said damper rod are disposed within said second damping chamber with said at least one piston element is disposed along said second side wall of said second damping element;

providing first and second damper biasing elements;

positioning said first damper biasing element between a first side of said element piston assembly and said first end of said second damper element; and, positioning said second damper biasing element between a second side of said element piston assembly and said second end of said second damper element.

18. A method according to claim 17 further comprising:

providing a first end member, a second end member and a flexible wall;

securing said first damper element on said first end member and securing said third damper element on said second end member; and, securing said flexible wall between said first and second end members such that a spring chamber is at least partially formed by said flexible wall between said first and second end member with said spring chamber containing at least said first, second and third damper elements.

19. A method according to claim 17, wherein providing said first and second damper biasing elements includes providing said first damper biasing element with a first spring rate and a first free length and said second damper biasing element with a second spring rate and a second free length with at least one of said second spring rate and said second free length being different than said first spring rate and said first free length of said first damper biasing element.

* * * * *